US012488716B2

(12) United States Patent
Feng et al.

(10) Patent No.: US 12,488,716 B2
(45) Date of Patent: Dec. 2, 2025

(54) METHOD OF REPAIRING GATE-ON-ARRAY CIRCUIT, GATE-ON-ARRAY CIRCUIT, AND DISPLAY APPARATUS

(71) Applicants: Hefei BOE Joint Technology Co.,Ltd., Anhui (CN); BOE Technology Group Co., Ltd., Beijing (CN)

(72) Inventors: Xuehuan Feng, Beijing (CN); Xuelian Cheng, Beijing (CN)

(73) Assignees: Hefei BOE Joint Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/784,644

(22) PCT Filed: Aug. 31, 2021

(86) PCT No.: PCT/CN2021/115597
§ 371 (c)(1),
(2) Date: Jun. 11, 2022

(87) PCT Pub. No.: WO2023/028822
PCT Pub. Date: Mar. 9, 2023

(65) Prior Publication Data

US 2024/0161665 A1 May 16, 2024

(51) Int. Cl.
*G09G 3/3266* (2016.01)
*G09G 3/00* (2006.01)

(52) U.S. Cl.
CPC ........... *G09G 3/006* (2013.01); *G09G 3/3266* (2013.01); *G09G 2310/08* (2013.01); *G09G 2330/12* (2013.01)

(58) Field of Classification Search
CPC .. G09G 3/006; G09G 3/3266; G09G 2310/08; G09G 2330/12;
(Continued)

(56) References Cited

U.S. PATENT DOCUMENTS 9,589,664 B2 * 3/2017 Lou ...................... G09G 3/3674
2006/0274021 A1 * 12/2006 Park ......................... G09G 3/20
345/100
(Continued)

FOREIGN PATENT DOCUMENTS

CN 101510404 A 8/2009
CN 101577106 A 11/2009
(Continued)

OTHER PUBLICATIONS

International Search Report & Written Opinion mailed May 27, 2022, regarding PCT/CN2021/115597.

*Primary Examiner* — Jeff Piziali
(74) *Attorney, Agent, or Firm* — Intellectual Valley Law, P.C.

(57) ABSTRACT

A method of repairing a gate-on-array circuit is provided. The method includes at least one of disconnecting a X-th stage gate driving signal output terminal from a X-th stage gate driving signal output line; disconnecting a X-th stage compensation control signal output terminal from a X-th stage compensation control signal output line; or disconnecting a X-th stage carry signal output terminal from a X-th stage carry signal output line. The method further includes at least one of connecting the X-th stage gate driving signal output line to a repair gate driving signal output terminal through a gate driving signal output repair line; connecting the X-th stage compensation control signal output line to a repair compensation control signal output terminal through a compensation control signal output repair line; or connecting the X-th stage carry signal output line to a repair carry signal output terminal through a carry signal output repair fine.

12 Claims, 23 Drawing Sheets

(58) Field of Classification Search
CPC ... G09G 2300/0408; G09G 2310/0286; G09G 2330/08; G11C 29/702; G11C 19/28
See application file for complete search history.

(56) References Cited

U.S. PATENT DOCUMENTS

| | | | | |
|---|---|---|---|---|
| 2007/0085809 | A1* | 4/2007 | Wei | G09G 3/3677 345/100 |
| 2007/0132700 | A1* | 6/2007 | Cho | G11C 19/28 345/100 |
| 2007/0164972 | A1* | 7/2007 | Chang | G09G 3/3677 345/100 |
| 2007/0216634 | A1* | 9/2007 | Kim | G11C 19/28 345/100 |
| 2011/0102388 | A1* | 5/2011 | Chin | G09G 3/3677 345/98 |
| 2017/0256196 | A1* | 9/2017 | Yang | G09G 3/2092 |
| 2018/0301103 | A1 | 10/2018 | Li et al. | |
| 2020/0380898 | A1 | 12/2020 | Jung et al. | |
| 2021/0201818 | A1 | 7/2021 | Jang et al. | |

FOREIGN PATENT DOCUMENTS

| | | | |
|---|---|---|---|
| CN | 202736457 | U | 2/2013 |
| CN | 104766581 | A | 7/2015 |
| CN | 106328038 | A | 1/2017 |
| CN | 106803414 | A | 6/2017 |
| CN | 107768387 | A | 3/2018 |
| CN | 110706667 | A | 1/2020 |

* cited by examiner

METHOD OF REPAIRING GATE-ON-ARRAY CIRCUIT, GATE-ON-ARRAY CIRCUIT, AND DISPLAY APPARATUS

CROSS-REFERENCE TO RELATED APPLICATION

This application is a national stage application under 35 U.S.C. § 371 of International Application No. PCT/CN2021/115597, filed Aug. 21, 2021, the contents of which are incorporated by reference in the entirety.

TECHNICAL FIELD

The present invention relates to display technology, more particularly, to a method of repairing a gate-on-array circuit, a gate-on-array circuit, and a display apparatus.

BACKGROUND

An organic light emitting diode display apparatus typically includes an anode, an organic layer including at least a light emitting layer, and a cathode. OLEDs can either be a bottom-emission type OLED or a top-emission type OLED. In bottom-emission type OLEDs, the light is extracted from an anode side. In bottom-emission type OLEDs, the anode is generally transparent, while a cathode is generally reflective. In a top-emission type OLED, light is extracted from a cathode side. The cathode is optically transparent, while she anode is reflective.

SUMMARY

In one aspect, the present disclosure provides a method of repairing a gate-on-array circuit comprising N number of stages of gate driving units, the N number of stages of gate diving wits comprising a X-th stage gate driving unit, 1≤X≤N, X and N being positive integers; wherein the method comprises at least one of disconnecting a X-th stage gate diving signal output terminal from a X-th stage gate driving signal output line; disconnecting a X-w stage compensation control signal output terminal from a X-th stage compensation control signal output line; or disconnecting a X-th stage carry signal output terminal from a X-th stage carry signal output line; the method further comprises at least one of connecting the X-th stage gate diving signal output line to a repair gate diving signal output terminal through a gate driving signal output repair line; connecting the X-th stage compensation control signal output line to a repair compensation control signal output terminal through a compensation control signal output repair line; or connecting the X-th stage carry signal output line to a repair carry signal output terminal through a carry signal output repair line.

Optionally, the repair gate driving signal output terminal is a gate driving signal output terminal of a repair gate driving unit; the repair compensation control signal output terminal is a compensation control signal output terminal of the repair gate driving unit; or the repair carry signal output terminal is a carry signal output terminal of the repair gate driving unit.

Optionally, the method farther comprises at least one of connecting a pull-up node connecting terminal of the repair gate driving sit to a n-th stage pull-up node of a n-th stage gate driving unit through a pull-up node repair fine, 1≤n≤N, and n≠K, a being a positive integer, connecting a first pull-down node connecting terminal of the repair gate driving unit to a n-th stage first pull-down mode of the n-th stage gate diving unit through a first pull-down node repair line; or connecting a second pull-down node connecting terminal of the repair gate driving unit to a n-th stage second pull-down mode of the n-th stage gate driving unit through a second pull-down node repair line.

Optionally, n≠X−1.

Optionally, the repair gate driving unit and the X-th stage gate driving unit are coupled to at least one of one or more carry output clock signal lines configured to provide a same carry output clock signal; one or more compensation clock signal lines configured to provide a same compensation clock signal; or one or more gate driving clock signal lines configured to provide a same gate driving clock signal.

Optionally, the repair gate driving unit and the X-th stage gate diving unit are coupled to at least one of a same carry output clock signal line, a same compensation clock signal line, or a same gate diving clock signal line.

Optionally, the gate-on-array circuit comprises the N number of stages of gate driving units; K number of repair gate driving units; and at least one of M number of carry output clock signal lines, M number of compensation clock signal lines, or M number of gate driving clock signal lines; wherein the N number of stages of gate driving units comprise K groups, a respective group of the K groups comprising M number of gate driving units, N=(M≠K), K and M being positive integers; and a m-th gate diving unit in the respective group is coupled to at least one of a m-th carry output clock signal line, a m-th compensation clock signal line, or a m-th gate driving clock signal line.

Optionally, the repair gate driving unit and the X-th stage gate driving unit are coupled to at least one of two different carry output clock signal lines configured to provide a same carry output clock signal; two different compensation clock signal lines configured to provide a same compensation clock signal; or two different gate driving clock signal lines configured to provide a same gate driving clock signal.

Optionally, the gate-on-array circuit comprises the N number of stages of gate driving units; the repair gate driving unit; at least one of M number of carry output clock signal lines, M number of compensation clock signal lines, or M number of gate driving clock signal lines; and at least one of a repair carry output clock signal line, a repair compensation clock signal line, or a repair gate driving clock signal line; wherein the N number of stages of gate driving units comprise K groups, a respective group of the K groups comprising M number of gate driving units, N=(M+K), K and M being positive integers; a m-th gate driving writ is the respective group is coupled to at least one of a m-th carry output clock signal line, a m-th compensation clock signal line, or a m-th gate driving clock signal line; and the repair gate driving unit is coupled to at least one of the repair carry output clock signal line, the repair compensation clock signal line, or the repair gate diving clock signal line.

Optionally, the method further comprises at least one of providing a same carry output clock signal to the repair carry output clock signal line and a carry output clock signal line coupled to the X-th stage gate driving unit; providing a same compensation clock signal to the repair compensation clock signal line and a compensation clock signal line coupled to the X-th stage gate driving unit; or providing a same gate diving clock signal to the repair gate driving clock signal line and a gate driving clock signal line coupled to the X-th stage gate driving unit.

Optionally, the repair gate driving signal output terminal is a n-th stage gate driving signal output terminal of a n-th stage gate diving unit, 1≤n≤N, and n≠X; the repair compensation control signal output terminal is a n-th stage compensation control signal output terminal of the n-th stage gate driving unit; or the repair carry signal output terminal is a n-th stage repair carry signal output terminal of the n-th stage gate driving unit.

Optionally, n≠X−1.

In another aspect, the present disclosure provides a gate on-array circuit, comprising N number of stages of gate driving units; and at least one of a gate driving signal output repair line, a compensation control signal output repair line, or a carry signal output repair line.

Optionally, the gate-on-array circuit further comprises one or more repair gate driving units; wherein a respective repair gate driving unit comprises at least one of a pull-up node connecting terminal; a first pull-down node connecting terminal; or a second pull-down node connecting terminal.

Optionally, the gate-on-array circuit further comprises at least one of a pull-up node repair line, a first pull-down node repair line, or a second pull down node repair line.

Optionally, a respective repair gate driving unit comprises at least one of a gate driving signal output circuit and a gate driving signal output terminal connected to the gate driving signal output circuit; a compensation control signal output circuit and a compensation control signal output terminal connected to the compensation control signal output circuit; or a carry signal output circuit and a carry signal output terminal connected to the carry signal output circuit.

Optionally, the gate-on-array circuit comprises the N number of stages of gate driving units; K number of repair gate driving units; and at least one of M number of carry output clock signal lines, M number of compensation clock signal lines, or M number of gate driving clock signal lines; wherein the N umber of stages of gate driving units comprise K groups, a respective group of the K groups comprising M number of gate driving units, N=(M+E), K and M being positive integers; and a m-th gate diving unit in the respective group is coupled to at least one of a m-th carry output clock signal line, a m-th compensation clock signal fine, or a m-th gate diving clock signal line.

Optionally, the gate-on-array circuit comprises the N number of stages of gate driving units; a repair gate driving unit; at least one of M number of carry output clock signal lines, M number of compensation clock signal lines, or M number of gate driving clock signal lines; and at least one of a repair carry output clock signal line, a repair compensation clock signal line, or a repair gate driving clock signal line; wherein the N number of stages of gate driving units comprise K groups, a respective group of the K groups comprising M number of gate driving units, N=(M≠K), K and M being positive integers; a m-th gate driving unit in the respective group is coupled to at least one of a m-th carry output clock signal line, a m-th compensation cock signal line, or a m-th gate driving clock signal line; and the repair gate diving unit is coupled to at least one of fire repair carry output clock signal line, the repair compensation clock signal line, or the repair gate driving clock signal line.

Optionally, a respective one of the N number of stages of gate driving units comprises a pull-up control circuit; a pull-up node control circuit, and a pull-down node control circuit; wherein the respective one of the N number of stages of gate driving units further comprises at least one of a gate diving signal output circuit and a gate diving signal output terminal connected to the gate driving signal output circuit; a compensation control signal output circuit and a compensation control signal output terminal connected to the compensation control signal output circuit; or a carry signal output circuit and a carry signal output terminal connected to the carry signal output circuit.

In another aspect, the present disclosure provides a display apparatus, comprising a display panel, and the gate-on-array circuit described herein or fabricated by a method described herein.

BRIEF DESCRIPTION OF THE FIGURES

The following drawings are merely examples for illustrative purposes according to various disclosed embodiments and are not intended to limit the scope of the present invention.

FIG. 8A is a schematic diagram illustrating a repair gate driving snits in some embodiments according to the present disclosure.

DETAILED DESCRIPTION

The disclosure will now be described more specifically with reference to the following embodiments. It is to be noted that the following descriptions of some embodiment's are presented herein for purpose of illustration and description only. It is not intended to be exhaustive or to be limited to the precise form disclosed.

The present disclosure provides, inter alia, a method of repairing a gate-on-array circuit, a gate-on-array circuit, and a display apparatus that substantially obviate one or more of the problems due to limitations and disadvantages of the related art. Is one aspect, the present disclosure provides a method of repairing a gate-on-array circuit. The gate-on-array circuit includes N number of stages of gate driving units, the N number of stages of gate driving units comprising a X-th stage gate driving unit, 1≤X≤N, X and N being positive integers. In some embodiments, the method includes at least one of disconnecting a X-th stage gate driving signal output terminal from a X-th stage gate driving signal output line; disconnecting a X-th stage compensation control signal output terminal from a X-th stage compensation control signal output line; or disconnecting a X-th stage carry signal output terminal from a X-th stage carry signal output line. In some embodiments, the method further includes at least one of connecting the X-th stage gate driving signal output line to a repair gate driving signal output terminal through a gate driving signal output repair line; connecting the X-th stage compensation control signal output lice to a repair compensation control signal output terminal through a compensation control signal output repair line; or connecting the X-th stage carry signal output line to a repair carry signal output terminal through a carry signal output repair line.

Figure 1:
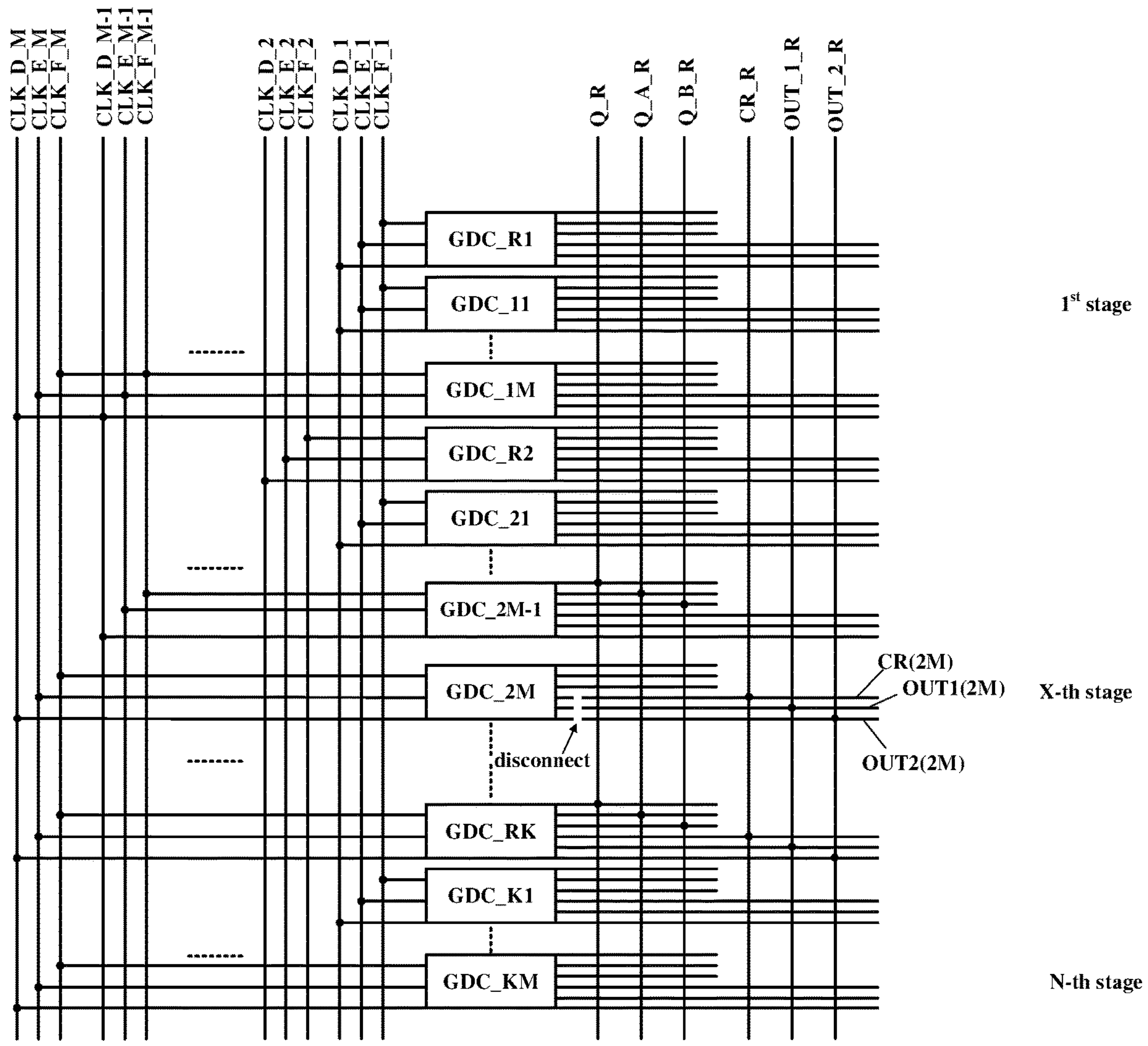
FIG. 1 is a schematic diagram illustrating a gate-on-array circuit in some embodiments according to the present disclosure.
Figure 2:
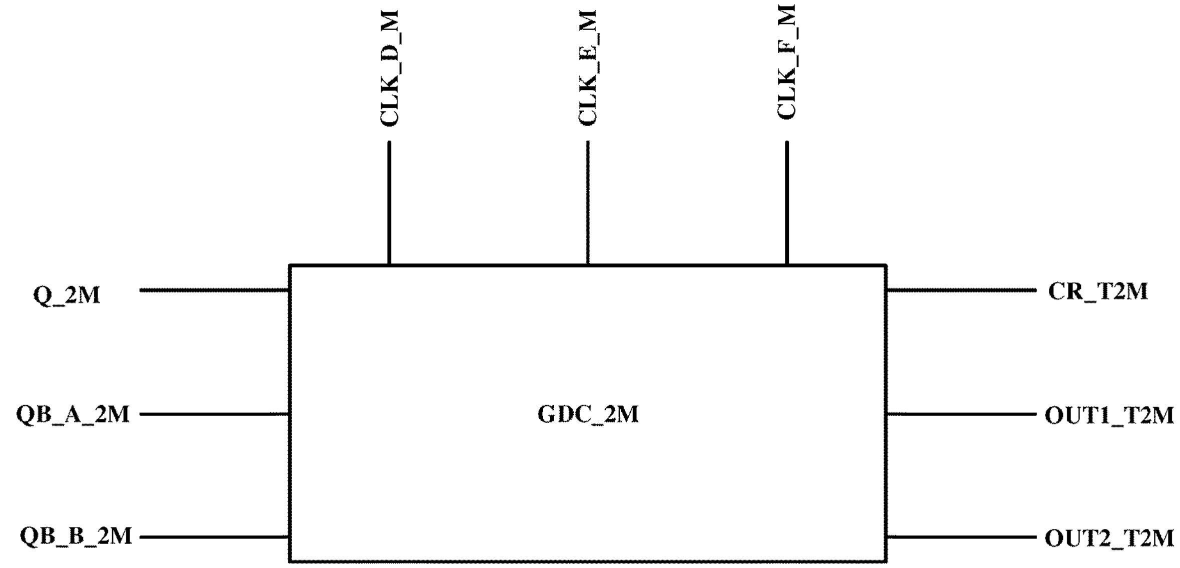
FIG. 2 is a schematic diagrams illustrating a gate driving unit in some embodiments according to the present disclosure.

FIG. 1 is a schematic diagram illustrating a gate on-array circuit in some embodiments according to the present disclosure. Referring to FIG. 1, the gate-on-array circuit includes N number of stages of gate driving units (GDU_11, . . . GDU_1M, GDU_21, . . . GDU_2M, . . . GDU_K1, . . . GDU_KM), the N number of stages of gate diving units comprising a X-th stage gate driving unit (e.g., the GDU_2M in FIG. 1), 1≤X≤N, X and N being positive integers. In one example, the X-th stage gate driving unit is dysfunctional and needs to be repaired. FIG. 2 is a schematic diagram illustrating a gate driving unit in some embodiments according to the present disclosure. FIG. 2 illustrates a X-th stage gate driving unit (e.g., GDU_2M is FIG. 1). Referring to FIG. 2, the X-th stage gate driving unit includes at least one of a X-th stage gate driving signal output terminal (e.g., OUT1_T2M), a X-th stage compensation control signal output terminal (e.g., OUT2_T2M), or a X-th stage carry signal output terminal (e.g., CR_T2M). The X-th stage gate driving unit further includes at least one of a X-th stage pull-up node (e.g., Q_2M), a X-th stage first pull-down node (e.g., QB_A_2M), or a X-th stage second pull-down node (e.g., QB_B_2M). The X-th stage gate driving writ is coupled to at least one of a M-th carry output clock signal line CLK_D_M, a M-th compensation clock signal line CLK_E_M, or a M-th gate driving clock signal me CLK_F_M.

In some embodiments, referring to FIG. 1 and FIG. 2, the method includes at least one of disconnecting a X-th stage gate driving signal output terminal (e.g., OUT1_T2M) from a X-th stage gate driving signal output line (e.g., OUT1 (2M)); disconnecting a X-th stage compensation control signal output terminal (e.g., OUT2_T2M) from a X-th stage compensation control signal output line (e.g., OUT2(2M)); or disconnecting a X-th stage carry signal output terminal (e.g., CR_T2M) from a X-th stage carry signal output line (e.g. CR(2M).

In one example, the method includes disconnecting a X-th stage gate driving signal output terminal (e.g., OUT1_T2M) from a X-th stage gate diving signal output line (e.g., OUT1(2M). In another example, the method includes disconnecting a X-th stage gate driving signal output terminal (e.g. OUT1_T2M) from a X-th stage gate driving signal output line (e.g., OUT1(2M)); and disconnecting a X-th stage compensation control signal output terminal (e.g., OUT2_T2M) from a X-th stage compensation control signal output line (e.g., OUT2(2M). In another example, the method includes disconnecting a X-th stage gate driving signal output terminal (e.g., OUT1_T2M) from a X-th stage gate driving signal output line (e.g., OUT1(2M); disconnecting a X-th stage compensation control signal output terminal (e.g., OUT2_T2M) from a X-th stage compensation control signal output line (e.g., OUT2(2M)); and disconnecting a X-th stage carry signal output terminal (e.g., CR_T2M) from a X-th stage carry signal output line (e.g., CR(2M).

Figure 3:
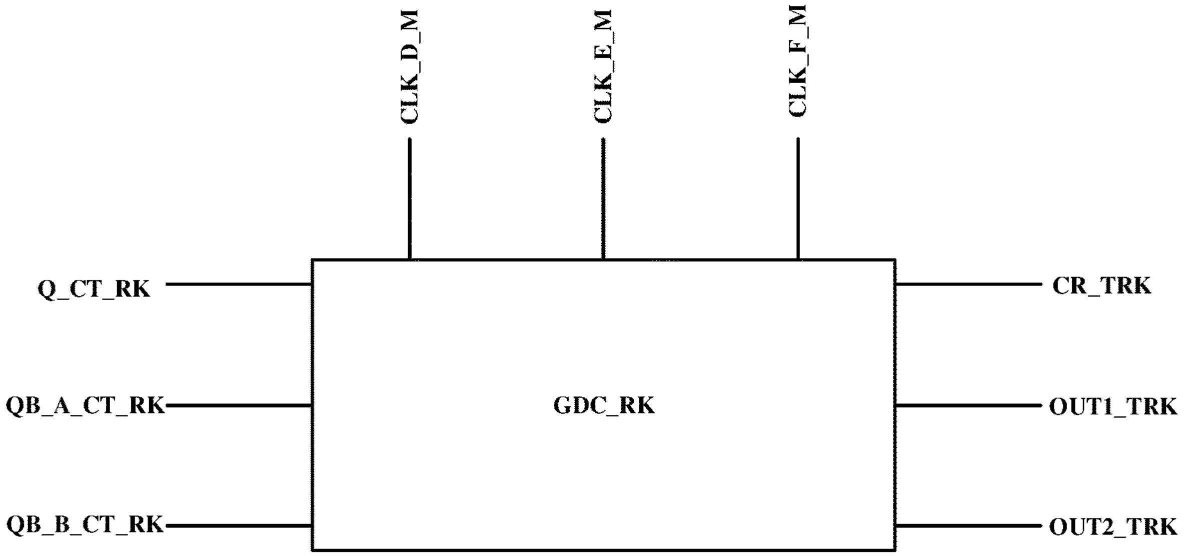
FIG. 3 is a schematic diagram illustrating a repair driving unit is some embodiments according to the present disclosure.

In some embodiment, the method further includes at least one of connecting the X-th stage gate diving signal output lice (e.g., OUT1(2M)) to a repair gate driving signal output terminal through a gate driving signal output repair line OUT_1_R, connecting the X-th stage compensation control signal output live to a repair compensation control signal output terminal through a compensation control signal output repair line OUT_2_R; or connecting the X-th stage carry signal output line to a repair carry signal output terminal through a carry signal output repair line CR_R. FIG. 3 is a schematic diagram illustrating a repair driving unit in some embodiments according to the present disclosure. FIG. 3 illustrates a X-th repair driving wait (e.g., GDU_RK is FIG. 1). Is some embodiments, the N number of stages of gate driving units include K groups. A respective group of the K groups includes M number of gate diving units, N=(M≠K), K and M being positive integers. In one particular example, M=8, K=8, and N=64. Referring to FIG. 3, the K-th repair driving unit GDU_RK includes at least one of a repair gate driving signal output terminal OUT1_TRK, a repair compensation control signal output terminal OUT2_TRK, or a repair carry signal output terminal CR_TRK. The K-th repair driving unit GDU_RK is coupled to at least one of a M-th carry output clock signal line CLK_D_M, a M-th compensation clock signal line CLK_E_M, or a M-th gate driving clock signal line CLK_F_M.

As shown in FIG. 1 and FIG. 3, the method further includes at least one of connecting the X-th stage gate driving signal output line (e.g., OUT1(2M)) to a repair gate driving signal output terminal OUT1_TRK through a gate driving signal output repair line (e.g., OUT_1_R); connecting the X-th stage compensation control signal output line to a repair compensation control signal output terminal (e.g., OUT2_TRK) through a compensation control signal output repair line OUT_2_R; or connecting the X-th stage carry signal output line to a repair carry signal output terminal (e.g., CR_TRK) through a carry signal output repair line CR_R. In one example, the method includes connecting the X-th stage gate diving signal output line (e.g., OUT1(2M) to a repair gate driving signal output terminal OUT1_TRK through a gate diving signal output repair line (e.g., OUT_1_R). In another example, the method includes connecting the X-th stage gate driving signal output line (e.g., OUT1)(2M)) to a repair gate driving signal output terminal OUT1_TRK through a gate driving signal output repair line (e.g., OUT_1_R); and connecting the X-th stage compensation control signal output line to a repair compensation control signal output terminal (e.g., OUT2_TRK) through a compensation control signal output repair line OUT_2_R. Is another example, the method includes connecting the X-th stage gate driving signal output line (e.g., OUT1(2M) to a repair gate driving signal output terminal OUT1_TRK through a gate driving signal output repair line (e.g., OUT_1_R); connecting the X-th stage compensation control signal output line to a repair compensation control signal output terminal (e.g., OUT2_TRK) through a compensation control signal output repair line OUT_2_R; and connecting the X-th stage carry signal output line to a repair carry signal output terminal (e.g., CR_TRK) through a carry signal output repair line CR_R.

In some embodiments, the method further includes at least one of connecting a pull-up node connecting terminal of the repair gate driving unit to a n-th stage pull-up node of a n-th stage gate driving unit through a pull-up node repair line Q_R, $1 \leq n \leq N$, and $n \neq X$, a being a positive integer; connecting a first pull-down node connecting terminal of the repair gate driving unit to a n-th stage first pull-down mode of the n-th stage gate driving unit through a first pull-down node repair line Q_A_R; or connecting a second pull-down node connecting terminal of the repair gate driving unit to a n-th stage second pull-down node of the n-th stage gate driving unit through a second pull-down node repair fine Q_B_R.

Figure 4:
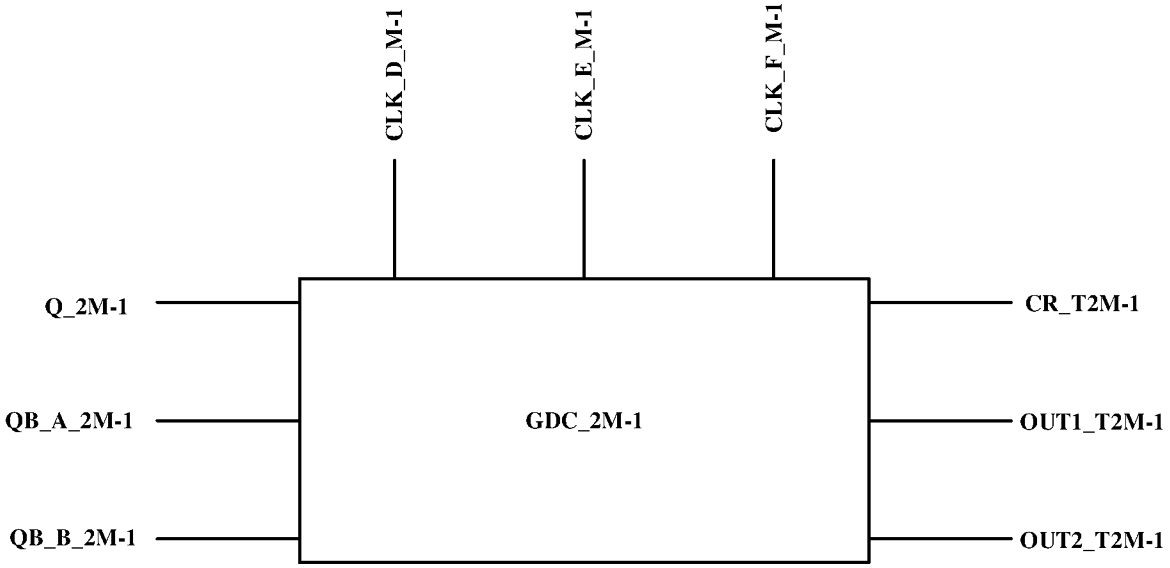
FIG. 4 is a schematic diagram illustrating a gate driving unit in some embodiments according to the present disclosure.

FIG. 4 is a schematic diagram illustrating a gate driving unit in some embodiments according to the present disclosure. FIG. 4 illustrates a (X−1)-th stage gate driving unit (e.g., GDU_2M−1 in FIG. 1). Referring to FIG. 4, the (X−1)-th stage gate driving unit includes at least one of a (X−1)-th stage pull-up node (e.g., Q_2M−1), a (X−1)-th stage first pull-down mode (e.g., QB_A_2M−1), or a (X−1)-th stage second pull-down node (e.g., QB_B_2M−1). The X−1)-th stage gate driving unit GDU_2M−1 further includes at least one of a (X−1)-th stage gate driving signal output terminal (e.g., OUT1_T2M−1), a (X−1)-th stage compensation control signal output terminal (e.g., OUT2_T2M−1), or a (X−1)-th stage carry signal output terminal (e.g., CR_T2M−1). The (X−1)-th stage gate driving unit GDU_2M−1 is coupled to at least one of a (M−1)-th carry output clock signal line CLK_D_M−1, a (M−1)-th compensation clock signal line CLK_E_M−1, or a (M−1)-th gate driving clock signal line CLK_F_M−1.

Referring to FIG. 3, in some embodiments, the X-th repair driving unit GDU_RK includes at least one of a pull-up node connecting terminal Q_CT_RK, a first pull-down mode connecting terminal QB_A_CT_RK, or a second pull-down node connecting terminal QB_B_CT_RK. Referring to FIG. 1, FIG. 3, and FIG. 4, is some embodiments, the method includes at least one of connecting a pull-up node connecting terminal (e.g., Q_CT_RK) of the repair gate diving unit (e.g., GDU_RK) to a n-th stage pull-up node (e.g., Q_2M−1) of a n-th stage gate driving unit (e.g., GDU_2M−1) through a pull-up node repair line Q_R; connecting a fast pull-down code connecting terminal (e.g., QB_A_CT_RK) of the repair gate driving unit (e.g., GDU_RK) to a n-th stage first pull-down node (e.g., QB_A_2M−1) of the n-th stage gate driving unit (e.g., GDU_2M−1) through a first pull-down node repair line Q_A_R; or connecting a second pull-down node connecting terminal (e.g., QB_B_CT_RK) of the repair gate driving unit (e.g., GDU_RK) to a n-th stage second pull-down node (e.g., QB_B_2M−1) of the n-th stage gate driving unit (e.g., GDU_2M−1) through a second pull-down node repair line Q_B_R.

In one example, the method includes connecting a pull-up node connecting terminal (e.g., Q_CT_RK) of the repair gate driving unit (e.g., GDU_RK) to a n-th stage pull-up node (e.g., Q_2M−1) of a n-th stage gate driving unit (e.g., GDU_2M−1) through a pull-up code repair line Q_R. Is another example, the method includes connecting a pull-up node connecting terminal (e.g., Q_CT_RK) of the repair gate diving unit (e.g., GDU_RK) to a n-th stage pull-up node (e.g., Q_2M−1) of a n-th stage gate driving unit (e.g., GDU_2M−1) through a pull-up node repair fixe Q_R; and connecting a first pull-down node connecting terminal (e.g., QB_A_CT_RK) of the repair gate driving unit (e.g., GDU_RK) to a n-th stage first pull-down node (e.g., QB_A_2M−1) of the n-th stage gate driving unit (e.g., GDU_2M−1) through a first pull-down node repair line Q_A_R. In another example, the method includes connecting a pull-up node connecting terminal (e.g., Q_CT_RK) of the repair gate driving unit (e.g., GDU_RK) to a n-th stage pull-up node (e.g., Q_2M−1) of a n-th stage gate driving unit (e.g. GDU_2M−1) through a pull-up node repair line Q_R; connecting a first pull-down node connecting terminal (e.g., QB_A_CT_RK) of the repair gate driving unit (e.g., GDU_RK) to a n-th stage first pull-down mode (e.g., QB_A_2M−1) of the n-th stage gate driving unit (e.g., GDU_2M−1) through a first pull-down node repair line Q_A_R; and connecting a second pull-down node connecting terminal (e.g., QB_B_CT_RK) of the repair gate driving suit (e.g., GDU_RK) to a n-th stage second pull-down node (e.g., QB_B_2M−1) of the n-th stage gate driving unit (e.g., GDU_2M−1) through a second pull-downs node repair line Q_B_R.

As shown in FIG. 1, in some embodiments, $n=X-1$. In one example, $X=2M$, and $n=(2M-1)$.

In some embodiments, the repair gate driving unit and the X-th stage gate driving unit are coupled to at least one of one or more carry output clock signal lines configured to provide a same carry output clock signal; one or more compensation clock signal lines configured to provide a same compensation clock signal; or one or more gate driving clock signal lines configured to provide a same gate driving clock signal.

In some embodiments, the repair gate driving unit and the X-th stage gate driving unit are coupled to at least one of a same carry output clock signal line, a same compensation clock signal line, or a same gate diving clock signal line. In one example, the repair gate driving unit and the X-th stage gate driving unit are coupled to a same gate driving clock signal line. In another example, the repair gate driving unit and the X-th stage gate driving unit are coupled to a same gate driving clock signal line and a same compensation clock signal line. In another example, the repair gate driving unit and the X-th stage gate driving unit are coupled to a same carry output clock signal line, a same compensation clock signal line, and a same gate driving clock signal line. Referring to FIG. 1, the repair gate driving unit (e.g., GDU_RK) and the X-th stage gate driving unit (e.g., GDU_2M) are coupled to at least one of a same carry output clock signal line (e.g., CLK_D_M), a same compensation clock signal line (e.g., CLK_E_M), or a same gate diving clock signal line (e.g., CLK_F_M).

In some embodiments, the gate-on-array circuit includes the N number of stages of gate driving units (e.g., GDU_11, . . . GDU_1M, GDU_21, . . . GDU_2M, . . . GDU_K1, . . . GDU_KM); K number of repair gate driving units (e.g., GDU_R1, GDU_R2, . . . , GDU_RK); and at least one of M number of carry output clock signal lines (e.g., CLK_D_1, CLK_D_2, . . . , CLK_D_M−1, CLK_D_M), M number of compensation clock signal lines (e.g., CLK_E_1, CLK_E_2, . . . , CLK_E_M−1, CLK_E_M), or M number of gate driving clock signal fines (e.g., CLK_F_1, CLK_F_2, . . . , CLK_F_M−1, CLK_F_M). Optionally, the N number of stages of gate driving units include K groups. A respective group of the K groups includes M number of gate diving units. For example, the second group of the K groups includes M number of gate diving units including GDU_21, . . . GDU_2M−1, and GDU_2M. Optionally, N=(M≠K), K and M being positive integers. Optionally, M=K. In one example, N=64, M=8, and K=8. As shown in FIG. 1, a m-th gate diving unit is the respective group is coupled to at least one of a m-th carry output clock signal line, a m-th compensation clock signal line, or a m-th gate driving clock signal line. For example, the GDU_2M−1 in the second group is coupled to at least one of CLK_D_M−1, CLK_E_M−1, or CLK_F_M−1.

As shown in FIG. 1, a k-th repair gate driving unit is coupled to at least one of a k-th carry output clock signal line, a k-th compensation clock signal line, or a k-th gate driving clock signal line. For example, the second repair gate driving unit GDU_R2 is coupled to at least one of a second carry output clock signal line CLK_D_2, a second compensation clock signal line CLK_E_2, or a second gate driving clock signal line CLK_F_2. Is another example, K=M, as shown in FIG. 1, the K-th repair gate driving unit GDU_RK is coupled to at least one of a M-th carry output clock signal line CLK_D_M, a M-th compensation clock signal line CLK_E_M, or a M-th gate driving clock signal line CLK_F_M. Accordingly, the repair gate driving unit (e.g., GDU_RK) and the X-th stage gate driving unit (e.g., GDU_2M) are coupled to at least one of a same carry output clock signal line, a same compensation clock signal line, or a same gate driving clock signal line.

Figure 5:
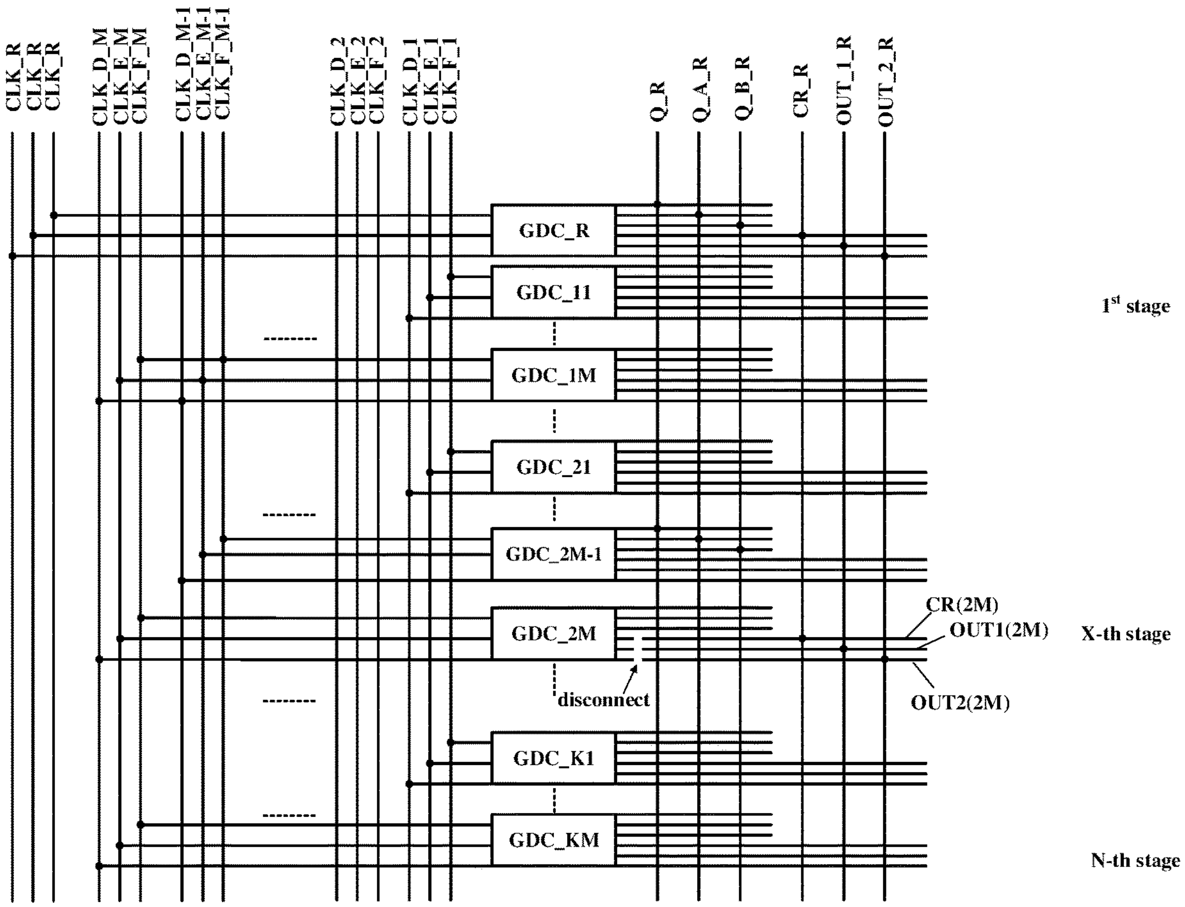
FIG. 5 is a schematic diagram illustrating a gate-on-array circuit is some embodiments according to the present disclosure.

FIG. 5 is a schematic diagram illustrating a gate-on-array circuit is some embodiments according to the present disclosure. Referring to FIG. 5, the gate-on-array circuit includes N number of stages of gate driving units (GDU_11, . . . GDU_1M, GDU_21, . . . GDU_2M, . . . GDU_K1, . . . GDU_KM), the N number of stages of gate driving units comprising a X-th stage gate driving unit (e.g., the GDU_2M in FIG. 1), 1≤X≤N, X and N being positive integers. In one example, the X-th stage gate driving unit is dysfunctional and needs to be repaired. In FIG. 5, the gate-on-array circuit includes one repair gate diving with (e.g., GDU_R) for the N number of stages of gate driving units (instead of K number of repair gate driving units as shown in FIG. 1). The repair gate driving unit (e.g., GDU_R) is coupled to at least one of the repair carry output clock signal line (CLK_D_R), the repair compensation clock signal line (CLK_E_R), or the repair gate driving clock signal line (CLK_F_R).

In some embodiments, referring to FIG. 5 and FIG. 2, the method includes at least one of disconnecting a X-th stage gate driving signal output terminal (e.g., OUT1_T2M) from a X-th stage gate driving signal output line (e.g., OUT1)(2M)); disconnecting a X-th stage compensation control signal output terminal (e.g., OUT2_T2M) from a X-th stage: compensation control signal output lice (e.g., OUT2(2M)); or disconnecting a X-th stage carry signal output terminal (e.g., CR_T2M) from a X-th stage carry signal output line (e.g., CR(2M).

Figure 6:
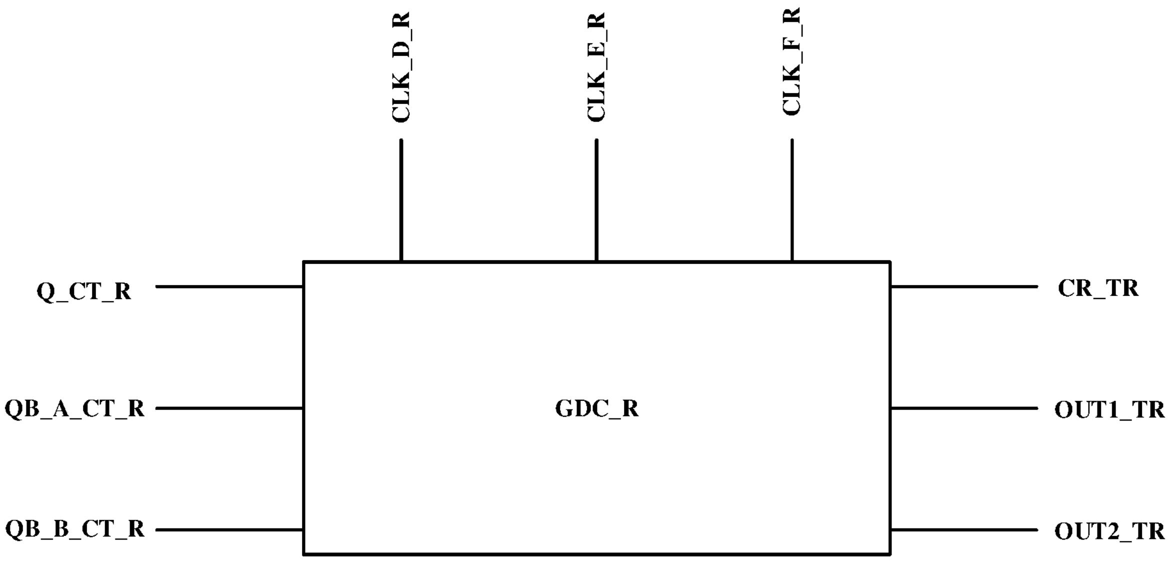
FIG. 6 is a schematic diagram illustrating a repair driving unit in some embodiments according to the present disclosure.

In some embodiments, the method further includes at least one of connecting the X-th stage gate diving signal output line (e.g., OUT1(2M) to a repair gate driving signal output terminal through a gate driving signal output repair line OUT_1_R; connecting the X-th stage compensation control signal output live to a repair compensation control signal output terminal through a compensation control signal output repair line OUT_2_R; or connecting the X-th stage carry signal output line to a repair carry signal output terminal through a carry signal output repair line CR_R. FIG. 6 is a schematic diagram illustrating a repair driving unit in some embodiments according to the present disclosure. FIG. 6 illustrates the repair driving wait (e.g., GDU_R) assigned for the N number of gate driving units in FIG. 5. Referring to FIG. 6, the repair driving unit GDU_R includes at least one of a repair gate driving signal output terminal QUT1_TR, a repair compensation control signal output terminal OUT2_TR, or a repair carry signal output terminal CR_TR. The repair driving unit GDU_R is coupled to at least one of a repair carry output clock signal line CLK_R, a repair compensation clock signal line CLK_R, or a repair gate driving clock signal line CLK_R.

In some embodiments, the N number of stages of gate driving units include K groups. A respective group of the K groups includes M number of gate driving units, N=(M≠K), K and M being positive integers. In one particular example, M=8, K=8, and N=64. As shown is FIG. 5 and FIG. 6, the method further includes at least one of connecting the X-th stage gate driving signal output line (e.g., OUT1(2M) to a repair gate driving signal output terminal OUT1_TR through a gate driving signal output repair line (e.g., OUT_1_R); connecting the X-th stage compensation control signal output line to a repair compensation control signal output terminal (e.g., OUT2_TR) through a compensation control signal output repair line OUT_2_R; or connecting the X-th stage carry signal output line to a repair carry signal output terminal (e.g., CR_TR) through a carry signal output repair line CR_R.

In some embodiments, the method further includes at least one of connecting a pull-up node connecting terminal of the repair gate driving unit to a n-th stage pull-up mode of a n-th stage gate diving unit through a pull-up node repair line Q_R, 1≤n≤N, and n≠K, n being a positive integer; connecting a first pull-down node connecting terminal of the repair gate driving unit to a n-th stage first pull-down mode of the n-th stage gate diving unit through a first pull-down mode repair line Q_A_R; or connecting a second pull-down node connecting terminal of the repair gate diving unit to a n-th stage second pull-down mode of the n-th stage gate driving unit through a second pull-down node repair line Q_B_R.

Referring to FIG. 6, in some embodiments, the repair driving unit GDU_R includes at least one of a pull-up node connecting terminal Q_CT_R, a first pull-down node connecting terminal QB_A_CT_R, or a second pull-down node connecting terminal QB_B_CT_R. Referring to FIG. 5, FIG. 6, and FIG. 4, in some embodiments, the method includes at least one of connecting a pull-up node connecting terminal (e.g., Q_CT_R) of the repair gate diving unit (e.g., GDU_R) to a n-th stage pull-up node (e.g., Q_2M−1) of a n-th stage gate driving unit (e.g., GDU_2M−1) through a pull-up node repair line Q_R; connecting a first pull-down node connecting terminal (e.g., QB_A_CT_R) of the repair gate driving unit (e.g., GDU_R) to a n-th stage first pull-down node (e.g., QB_A_2M−1) of the n-th stage gate driving unit (e.g., GDU_2M−1) through a first pull-down node repair line Q_A_R; or connecting a second pull-down node connecting terminal (e.g., QB_B_CT_R) of the repair gate diving unit (e.g., GDU_R) to a n-th stage second pull-down node (e.g., QB_B_2M−1) of the n-th stage gate driving unit (e.g., GDU_2M−1) through a second pull-down node repair line Q_B_R.

As shown in FIG. 1, in some embodiments, n=X−1. In one example, X=2M, and n=(2M−1).

In some embodiments, the repair gate driving unit and the X-th stage gate driving unit are coupled to at least one of two different carry output clock signal lines configured to provide a same carry output clock signal; two different compensation clock signal lines configured to provide a same compensation clock signal; or two different gate driving clock signal lines configured to provide a same gate driving clock signal. In one example, the repair gate driving unit and the X-th stage gate driving unit are coupled to two different gate driving clock signal lines configured to provide a same gate driving clock signal. In another example, the repair gate driving unit and the X-th stage gate driving unit are coupled to two different gate driving clock signal lines configured to provide a same gate driving clock signal, and two different compensation clock signal lines configured to provide a same compensation clock signal. In another example, the repair gate driving unit and the X-th stage gate driving unit are coupled to two different carry output clock signal lines configured to provide a same carry output clock signal; two different compensation clock signal lines configured to provide a same compensation clock signal; and two different gate driving clock signal lines configured to provide a same gate driving clock signal. Referring to FIG. 6, the repair gate driving unit (e.g., GDU_R) is coupled to at least one of a repair carry output clock signal line CLK_D_R, a repair compensation clock signal line CLK_E_R, or a repair gate driving clock signal line CLK_F_R. The X-th stage gate driving unit is coupled to at least one of a M-th carry output clock signal line (e.g., CLK_D_M), a M-th compensation clock signal line (e.g., CLK_E_M), and a M-th gate driving clock signal line (e.g., CLK_F_M).

In some embodiments, the gate-on-array circuit includes the N number of stages of gate driving units (e.g., GDU_11, . . . GDU_1M, GDU_21, . . . GDU_2M, . . . . GDU_K1, . . . GDU_KM); a repair gate driving unit (e.g., GDU_R); at least one of M number of carry output dock signal lines (e.g., CLK_D_1, CLK_D_2, . . . , CLK_D_M−1, CLK_D_M), M number of compensation clock signal lines (e.g., CLK_E_1, CLK_E_2, . . . , CLK_E_M−1, CLK_E_M), or M number of gate driving clock signal lines (e.g., CLK_F_1, CLK_F_2, . . . , CLK_F_M−1, CLK_F_M); and at least one of a repair carry output clock signal line (e.g., CLK_D_R), a repair compensation clock signal line (e.g., CLK_E_R), or a repair gate driving clock signal line (e.g., CLK_F_R). Optionally, the N number of stages of gate driving units include K groups. A respective group of the K groups includes M number of gate driving units. For example, the second group of the K groups includes M number of gate diving wits including GDU_21, . . . GDU_2M−1, and GDU_2M. Optionally, N=(M≠K), K and M being positive integers. As shown in FIG. 5, a m-th gale driving unit in the respective group is coupled to at least one of a m-th carry output clock signal line, a m-th compensation clock signal line, or a m-th gate driving clock signal line. For example, the GDU_2M−1 is the second group is coupled to at least one of CLK_D_M−1, CLK_E_M−1, or CLK_F_M−1.

Because the repair gate driving unit and the X-th stage gate driving unit are coupled different clock signal lines, in some embodiments, the method further includes at least one of providing a same carry output clock signal to the repair carry output clock signal line and a carry output clock signal line coupled to the X-th stage gate driving unit; providing a same compensation clock signal to the repair compensation clock signal line and a compensation clock signal line coupled to the X-th stage gate driving unit; or providing a same gate driving clock signal to the repair gate driving clock signal line and a gate driving clock signal line coupled to the X-th stage gate driving unit. In one example, the method includes providing a same gate diving clock signal to the repair gate diving clock signal line and a gate driving clock signal line coupled to the X-th stage gate driving unit. In another example, she method includes providing a same gate driving clock signal to the repair gate driving clock signal line and a gate driving clock signal line coupled to the X-th stage gate driving unit, and providing a same compensation clock signal to the repair compensation clock signal line and a compensation clock signal line coupled to the X-th stage gate diving unit. In another example, the method includes providing a same carry output clock signal to the repair carry output clock signal line and a carry output clock signal line coupled to the X-th stage gate driving snit; providing a same compensation clock signal to the repair compensation clock signal line and a compensation clock signal line coupled to the X-th stage gate driving unit; and providing a same gate driving clock signal to the repair gate driving clock signal line and a gate driving clock signal line coupled to the X-th stage gate driving unit. Referring to FIG. 1, in one example, the method includes at least one of providing a same carry output dock signal to the repair carry output clock signal line (e.g., CLK_D_R) and a carry output clock signal line (e.g., CLK_D_M) coupled to the X-th stage gate diving unit (e.g., GDU_2M); providing a same compensation clock signal to the repair compensation clock signal line (e.g., CLK_E_R) and a compensation clock signal line (e.g., CLK_E_M) coupled to the X-th stage gate driving unit (e.g., GDU_2M); or providing a same gate driving clock signal to the repair gate driving clock signal line (e.g., CLK_F_R) and a gate driving clock signal line (e.g., CLK_F_M) coupled to the X-th stage gate driving unit (e.g., GDU_2M).

Figure 7:
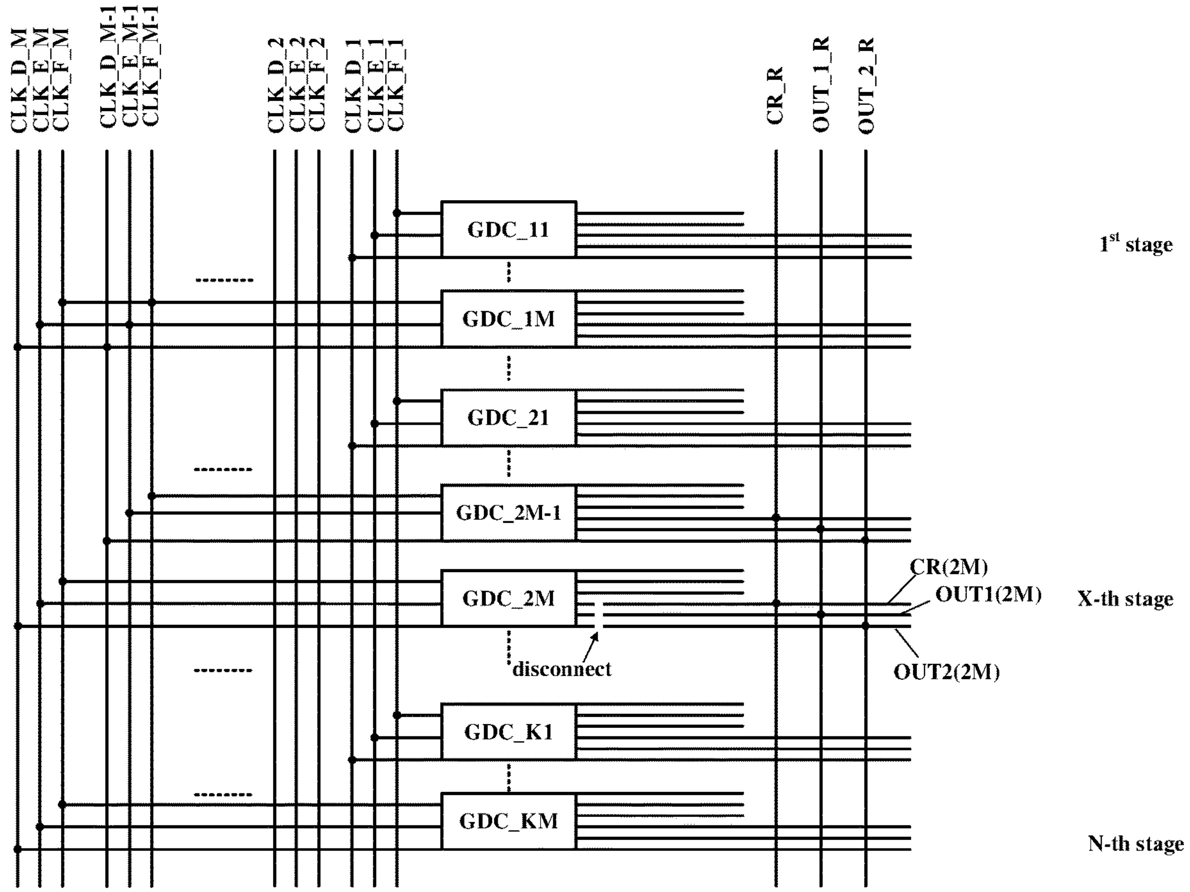
FIG. 7 is a schematic diagram illustrating a gate-on-array circuit in some embodiments according to the present disclosure.

In some embodiments, the repair gate driving signal output terminal is a n-th stage gate driving signal output terminal of a n-th stage gate driving unit, 1≤n≤N, and n≠X; the repair compensation control signal output terminal is a n-th stage compensation control signal output terminal of the n-th stage gate driving unit, or the repair carry signal output terminal is a n-th stage repair carry signal output terminal of the n-th stage gate diving unit. FIG. 7 is a schematic diagram illustrating a gate-on-array circuit in some embodiments according to the present disclosure. Referring to FIG. 7 and FIG. 4, in some embodiments, the repair gate driving signal output terminal is a n-th stage gate driving signal output terminal (e.g., OUT1_T2M−1) of a n-th stage gate driving unit (e.g., GDU_2M−1); the repair compensation control signal output terminal is a n-th stage compensation control signal output terminal (e.g., OUT2_T2M−1) of the n-th stage gate driving unit (e.g., GDU_2M−1); and the repair carry signal output terminal is a n-th stage repair carry signal output terminal (e.g., CR_T2M−1) of the n-th stage gate driving unit (e.g., GDU_2M−1). The X-th stage gate driving unit is provided with signals generated from the n-th stage gate diving unit.

In some embodiments, s=X−1.

In another aspect, the present disclosure provides a gate-on-array circuit. In some embodiments, the gate-on-array circuit includes N number of stages of gate driving units (see, e.g., FIG. 1, GDU_11, . . . GDU_1M, GDU_21, . . . GDU_2M, . . . GDU_K1, . . . GDU_KM); and at least one of a gate driving signal output repair line (e.g., OUT_1_R), a compensation control signal output repair line (OUT_2_R), or a carry signal output repair line (CR_R). In one example, the gate-on-array circuit includes a gate driving signal output repair line (e.g., OUT_1_R). In another example, the gate-on-array circuit includes a gate driving signal output repair line (e.g., OUT_1_R), and a compensation control signal output repair line (OUT_2_R). In another example, the gate-on-array circuit includes a gate driving signal output repair line (e.g., OUT_1_R), a compensation control signal output repair line (OUT_2_R), and a carry signal output repair line (CR_R).

In some embodiments, the gate-on-array circuit further includes one or more repair gate diving units. Referring to FIG. 6, a respective repair gate driving unit GDU_R includes at least one of a pull-up node connecting terminal Q_CT_R; a first pull-down node connecting terminal QB_A_CT_R; or a second pull-down node connecting terminal QB_B_CT_R. In one example, the gate-on-array circuit includes a pull-up mode connecting terminal Q_CT_R; and a first pull-down node connecting terminal QB_A_CT_R. In another example, the gate-on-array circuit includes a pull-up node connecting terminal Q_CT_R; a first pull-down node connecting terminal QB_A_CT_R; and a second pull-down node connecting terminal QB_B_CT_R.

In some embodiments, referring to FIG. 1 and FIG. 5, the gate-on-array circuit further includes at least one of a pull-up node repair line Q_R, a first pull-down node repair line Q_A_R, or a second pull-down node repair line Q_B_R. In one example, the gate-on-array circuit includes a pull-up node repair line Q_R, and a first pull-down node repair line Q_A_R. Is another example, the gate-on-array circuit includes a pull-up node repair line Q_R, a first pull-down node repair line Q_A_R, and a second pull-down mode repair line Q_B_R.

In some embodiments, referring to FIG. 1, the gate-on-array circuit includes the N number of stages of gate driving units (e.g., GDU_11, . . . GDU_1M, GDU_21, . . . GDU_2M, . . . , GDU_K1, . . . GDU_KM); K number of repair gate driving units (e.g., GDU_R1, GDU_R2, . . . , GDU_RK); and at least one of M number of carry output clock signal lines (e.g., CLK_D_1, CLK_D_2, . . . . CLK_D_M−1, CLK_D_M), M number of compensation clock signal lines (e.g., CLK_E_1, CLK_E_2, . . . , CLK_E_M−1, CLK_E_M), or M number of gate diving clock signal lines (e.g., CLK_F_1, CLK_F_2, . . . , CLK_F_M−1, CLK_F_M). Optionally, the N number of stages of gate driving units include K groups. A respective group of the K groups includes M member of gate diving units. For example, the second group of the K groups includes M number of gate driving units including GDU_21, . . . GDU_2M−1, and GDU_2M. Optionally, N=(M≠K), K and M being positive integer. Optionally, M=K. In one example, N=64, M=8, and K=8. As shown in FIG. 1, a M-th gate diving unit in the respective group is coupled to at least one of a m-th carry output clock signal line, a m-th compensation clock signal line, or a m-th gate driving clock signal line. For example, the GDU_2M−1 in the second group is coupled to at least one of CLK_D_M−1, CLK_E_M−1, or CLK_F_M−1.

Referring to FIG. 1, a k-th repair gate driving unit is coupled to at least one of a k-th carry output clock signal line, a k-th compensation clock signal line, or a k-th gate driving clock signal line. For example, the second repair gate driving unit GDU_R2 is coupled to at least one of a second carry output clock signal line CLK_D_2, a second compensation clock signal line CLK_E_2, or a second gate driving clock signal line CLK_F_2. In another example, K=M, as shown a FIG. 1, the K-th repair gate driving unit GDU_RK is coupled to at least que of a M-th carry output clock signal line CLK_D_M, a M-th compensation clock signal line CLK_E_M, or a M-th gate driving clock signal line CLK_F_M.

In some embodiments, referring to FIG. 5, the gate-on-array circuit includes N number of stages of gate driving units (GDU_11, . . . GDU_1M, GDU_21, . . . GDU_2M, . . . GDU_K1, . . . GDU_KM); a repair gate driving unit (e.g., GDU_R) for the N number of stages of gate driving units; at least one of M number of carry output clock signal lines (e.g., CLK_D_1, CLK_D_2 . . . . CLK_D_M−1, CLK_D_M). M number of compensation clock signal lines (e.g., CLK_E_1, CLK_E_2, . . . , CLK_E_M−1, CLK_E_M), or M number of gate diving dock signal lines (e.g., CLK_F_1, CLK_F_2, . . . , CLK_F_M−1, CLK_F_M); and at least one of a repair carry output clock signal line (CLK_D_R), a repair compensation clock signal line (CLK_E_R), or a repair gate driving clock signal line (CLK_F_R). The repair gate driving unit (e.g. GDU_R) is coupled to at least one of the repair carry output clock signal line (CLK_D_R), the repair compensation clock signal line (CLK_E_R), or the repair gate driving clock signal line (CLK_F_R).

In some embodiments, the N number of stages of gate diving units include K groups. A respective group of the K groups includes M number of gate driving units, N=(M≠K), K and M being positive integers. In one particular example, M=8, K=8, and N=64. As shown in FIG. 5, a m-th gate diving unit in the respective group is coupled to at least one of a m-th carry output clock signal line, a m-th compensation clock signal line, or a m-th gate diving clock signal line. For example, the GDU_2M−1 in the second group is coupled to at least one of CLK_D_M−1, CLK_E_M−1, or CLK_F_M−1.

In some embodiment, a respective one of the N number of stages of gate driving units includes a pull-up control circuit; a pull-up node control circuit; and a pull-down mode control circuit. The respective one of the N number of stages of gate driving units further includes at least one of a gate driving signal output circuit and a gate driving signal output terminal connected to the gate driving signal output circuit; a compensation control signal output circuit and a compensation control signal output terminal connected to the compensation control signal output circuit; or a carry signal output circuit and a carry signal output terminal connected to the carry signal output circuit.

Figure 8A:
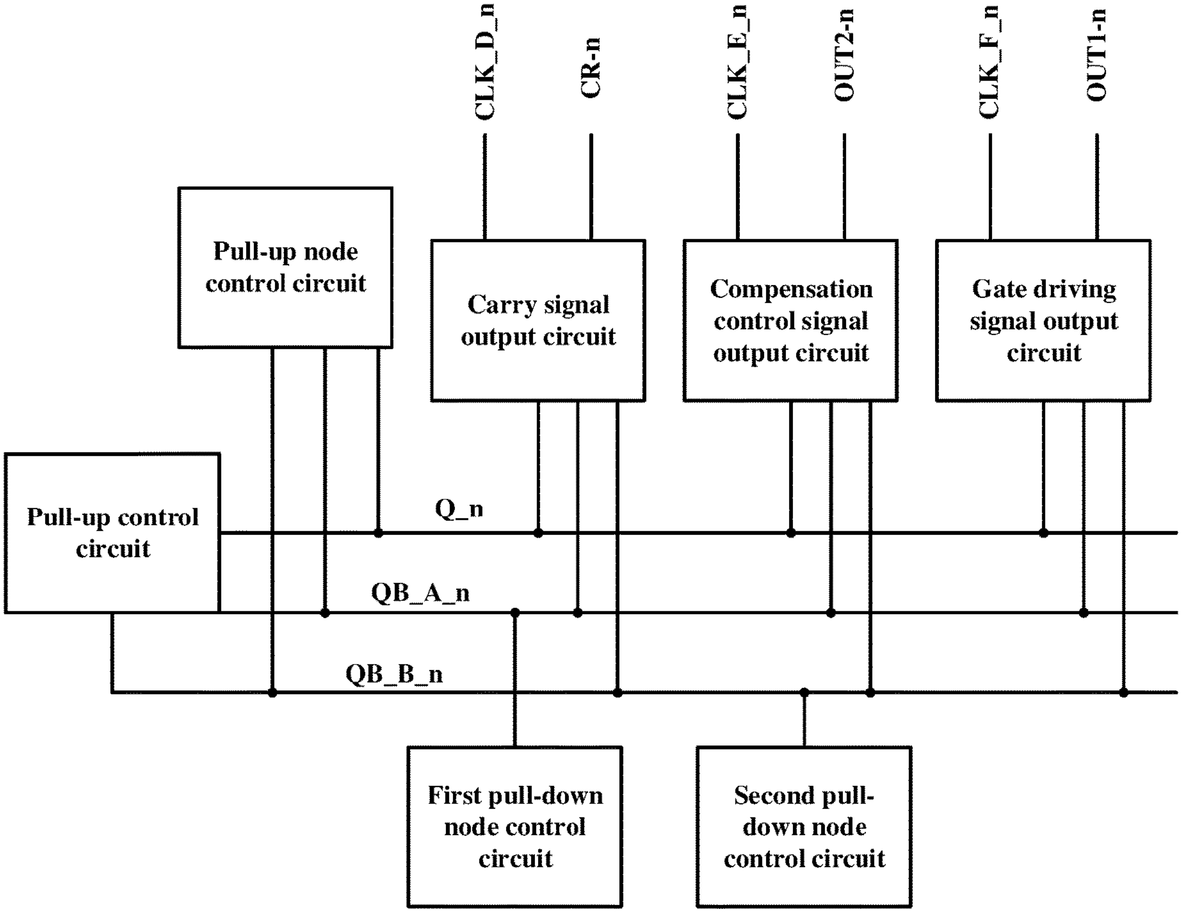
FIG. 8A is a schematic diagram illustrating a respective one of N number of stages of gate driving units in some embodiments according to the present disclose.

FIG. 8A is a schematic diagram illustrating a respective one of N number of stages of gate driving units in some embodiments according to the present disclosure. Referring to FIG. 8A, the respective one of the N number of stages of gate driving units includes a pull-up control circuit; a pull-up node control circuit; a first pull-down node control circuit, a second pull-down node control circuit; a carry signal output circuit and a carry signal output terminal CR-n connected to the carry signal output circuit, a compensation control signal output circuit and a compensation control signal output terminal OUT2−n connected to the compensation control signal output circuit; and a gate driving signal output circuit and a gate driving signal output terminal OUT1−n connected to the gate driving signal output circuit.

Figure 8B:
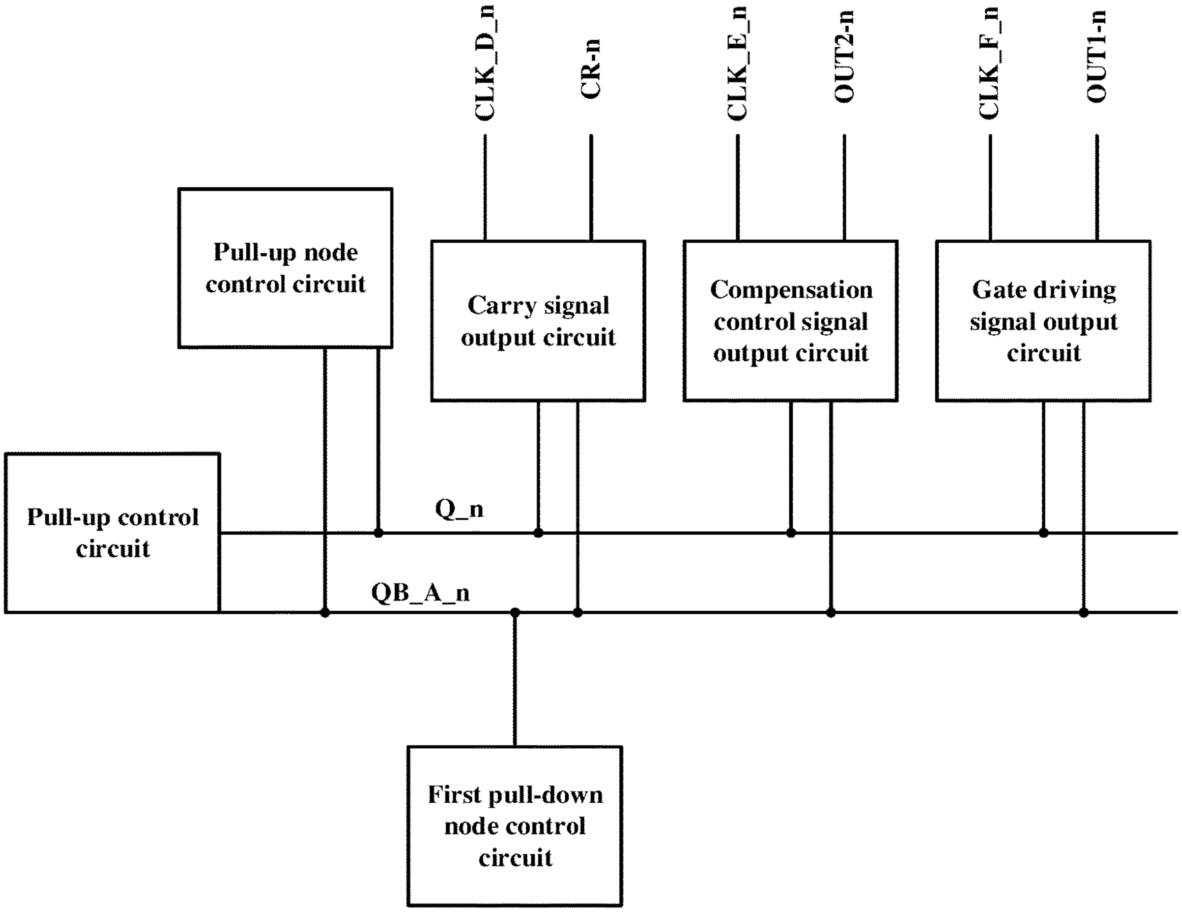
FIG. 8B is a schematic diagram illustrating a respective one of N number of stages of gate driving units in some embodiments according to the present disclosure.

FIG. 8B is a schematic diagram illustrating a respective one of N number of stages of gate driving units in some embodiments according to the present disclosure. Referring to FIG. 8B, the respective one of the N number of stages of gate driving units includes a pull-up control circuit; a pull-up node control circuit, a first pull-down node control circuit, a carry signal output circuit and a carry signal output terminal CR-n connected to the carry signal output circuit; a compensation control signal output circuit and a compensation control signal output terminal OUT2−n connected to the compensation control signal output circuit; and a gate driving signal output circuit and a gate driving signal output terminal OUT1−n connected to the gate driving signal output circuit.

In some embodiment, a respective repair gate driving unit includes at least one of a gate driving signal output circuit and a gate driving signal output terminal connected to the gate driving signal output circuit; a compensation control signal output circuit and a compensation control signal output terminal connected to the compensation control signal output circuit; or a carry signal output circuit and a carry signal output terminal connected to the carry signal output circuit.

Figure 9A:
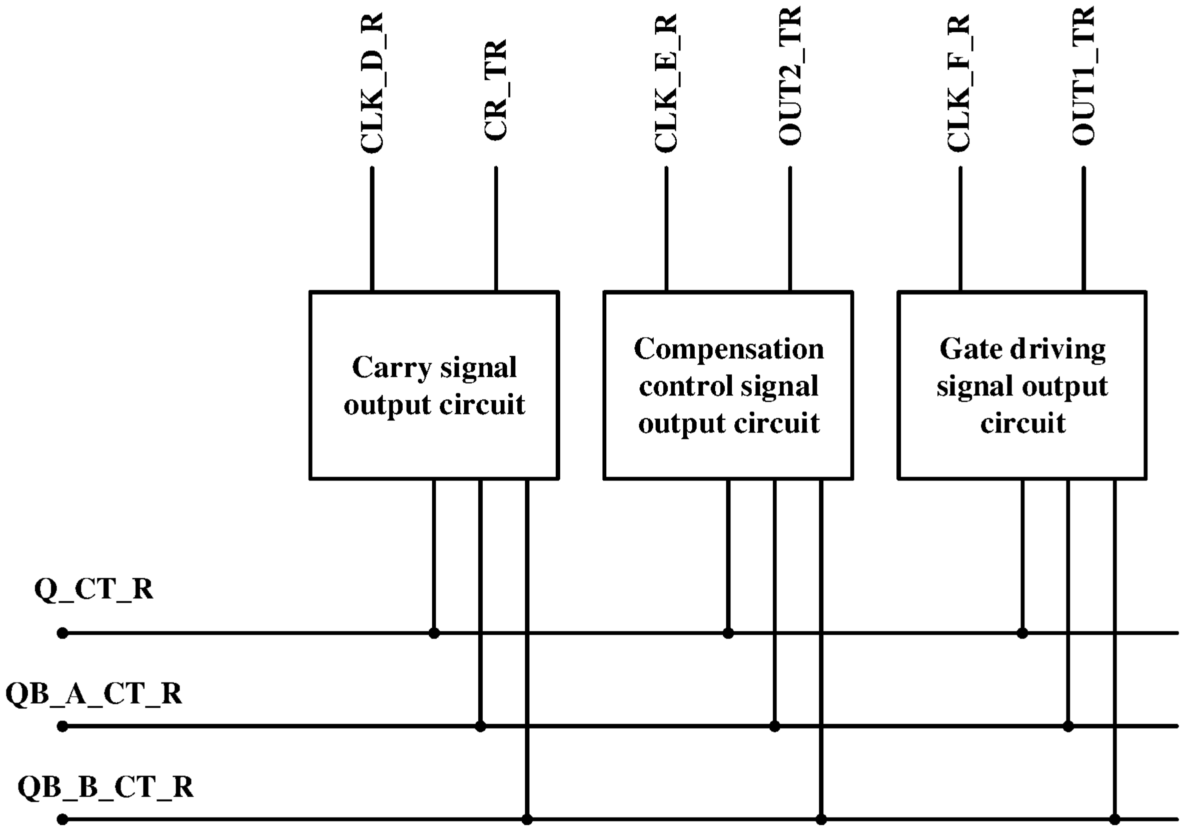
FIG. 9B is a schematic diagram illustrating a repair gate driving units in some embodiments according to the present disclosure.
Figure 9B:
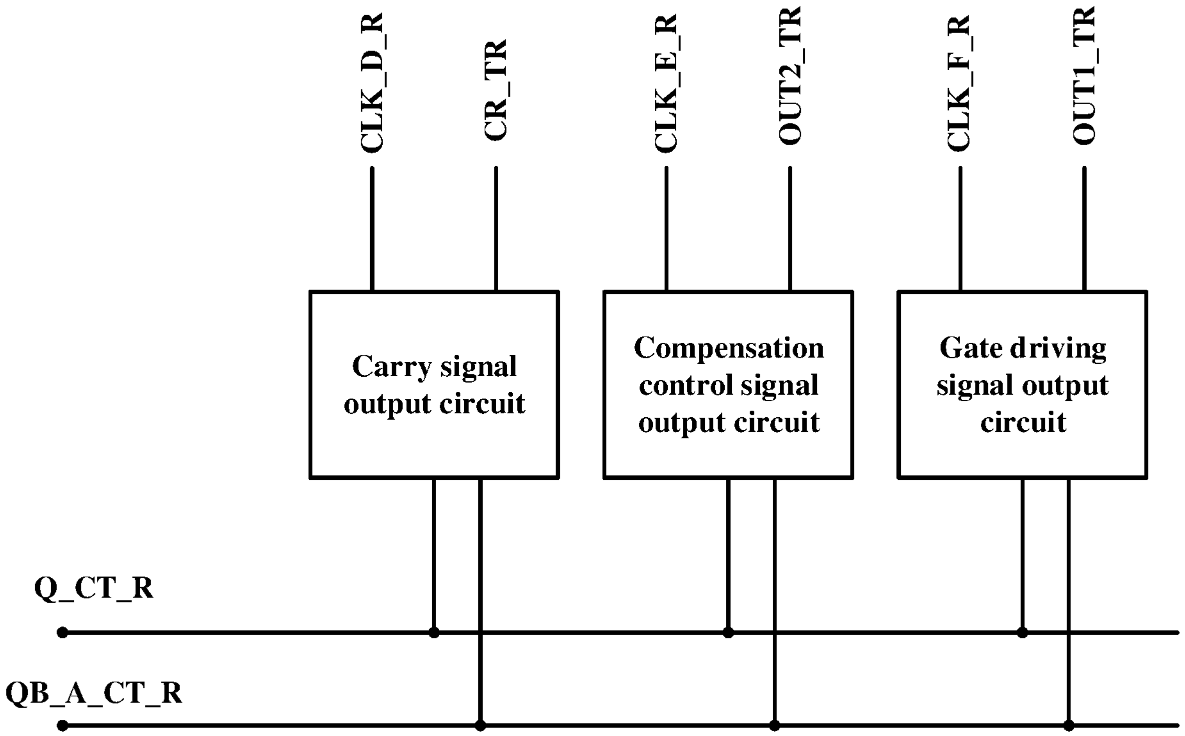

FIG. 9A is a schematic diagram illustrating a repair gate driving units in some embodiments according to the present disclosure. FIG. 9B is a schematic diagram illustrating a repair gate driving units in some embodiments according to the present disclosure. Referring to FIG. 9A and FIG. 9B, the respective repair gate driving unit includes at least one of a gate driving signal output circuit and a gate driving signal output terminal OUT1_TR connected to the gate driving signal output circuit; a compensation control signal output circuit and a compensation control signal output terminal OUT2_TR connected to the compensation control signal output circuit, or a carry signal output circuit and a carry signal output terminal CR_TR connected to the carry signal output circuit. In FIG. 9A, the respective repair gate driving unit includes a pull-up node connecting terminal Q_CT_R, a first pull-down mode connecting terminal QB_A_CT_R, and a second pull-down mode connecting terminal QB_B_CT_R. In FIG. 9B, the respective repair gate driving unit includes a pull-up node connecting terminal Q_CT_R, and a first pull-down node connecting terminal QB_A_CT_R. The respective repair gate driving unit in FIG. 9B does not include a second pull-down node connecting terminal QB_B_CT_R.

As compared to the respective one of N number of stages of gate driving units, the respective repair gate driving unit does not include a pull-up control circuit, a pull-up node control circuit, a first pull-down node control circuit, or a second pull-down node control circuit.

Figure 10:
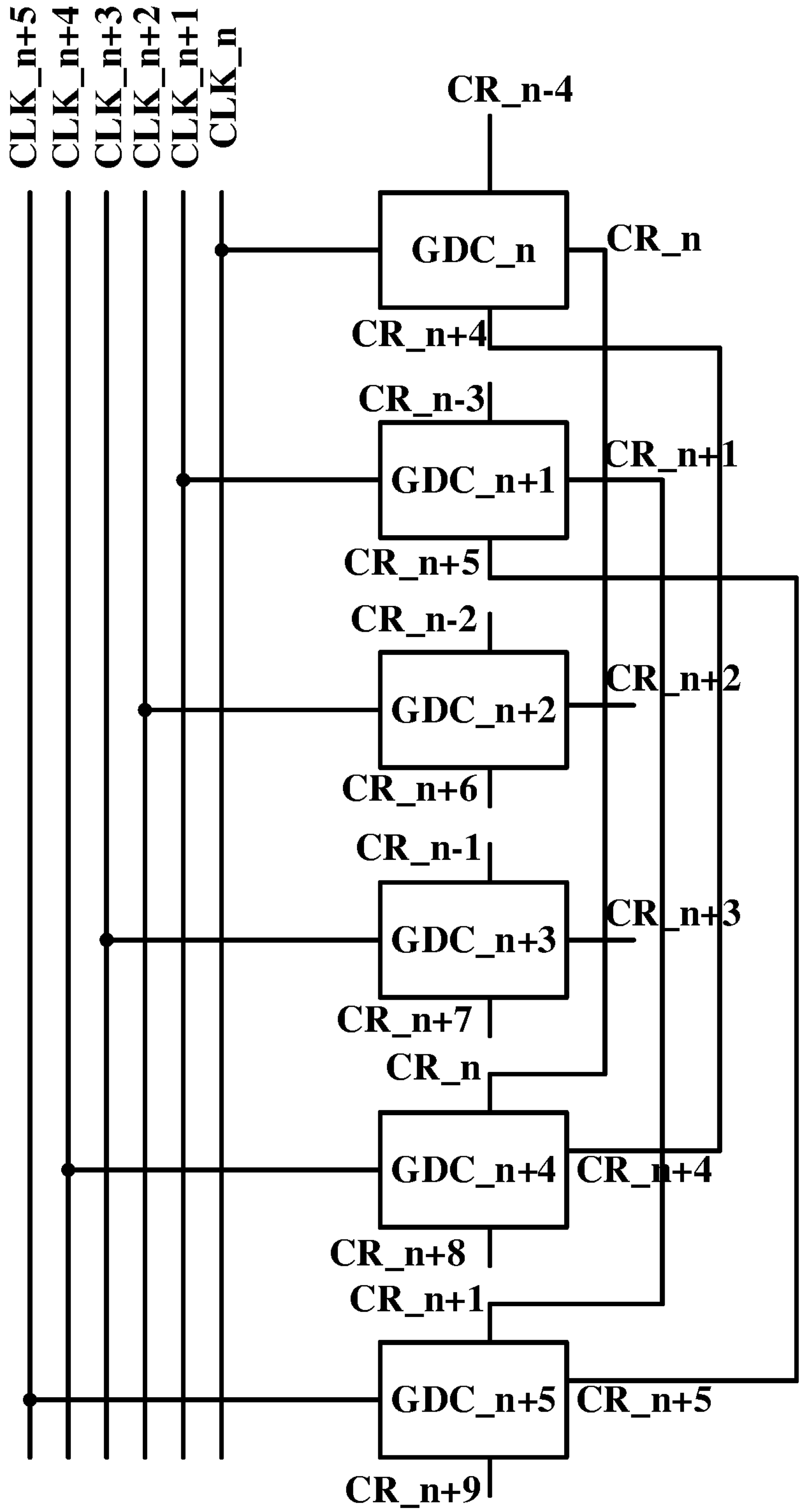
FIG. 10 illustrates connection among six consecutive stages of gate driving units in a gate-on-array circuit in some embodiments according to the present disclosure.

FIG. 10 illustrates connection among six consecutive stages of gate driving units in a gate-on-array circuit a some embodiments according to the present disclosure. Referring to FIG. 10, six consecutive stages of gate driving units includes a n-th stage gate driving unit GDU_n, a (n+1)-th stage gate driving unit GDU_n+1, a (n+2)-th stage gate driving unit GDU_n+2, a (n+3)-th stage gate driving unit GDU_n+3, a (n+4)-th stage gate driving unit GDU_n+4, and a (n+5)-th stage gate diving unit GDU_n+5. The n-th stage gate driving unit GDU_n is connected to one or more n-th clock signal line (including a n-th carry output clock signal line, a n-th compensation clock signal line, or a n-th gate diving clock signal line). The (n+1)-th stage gate driving unit GDU_n+1 is connected to one or more (n+1)-th clock signal line (including a (n+1)-th carry output clock signal line, a (n+1)-th compensation clock signal line, or a (n+1)-th gate driving clock signal line). The (n+2)-th stage gate driving unit GDU_n+2 is connected to one or more (n+2)-th clock signal line (including a (n+2)-th carry output clock signal line, a (n+2)-th compensation clock signal line, or a (n+2)-th gate driving clock signal line). The (n+3)-th stage gate driving unit GDU_n+3 is connected to one or more (n+3)-th clock signal line (including a (n+3)-th carry output clock signal line, a (n+3)-th compensation clock signal line, or a (n+3)-th gate driving clock signal line). The (n+4)-th stage gate driving unit GDU_n+4 is connected to one or more (n+4)-th clock signal line (including a (n+4)-th carry output clock signal line, a (n+4)-th compensation clock signal line, or a (n+4)-th gate driving clock signal line). The (n+5)-th stage gate driving unit GDU_n+5 is connected to one or more (n+5)-th clock signal line (including a (n+5)-th carry output clock signal line, a (n+5)-th compensation clock signal line, or a (n+5)-th gate driving clock signal line).

The n-th stage gate driving unit GDU_n is configured to receive a carry signal CR_n−4 output from a (2-4)-th stage gate driving unit, configured to receive a carry signal CR_n+4 from a (n+4)-th stage gate driving unit GDU_n+4, and configured to output a carry signal CR_n to the (n+4)-th stage gate driving unit GDU_8+4. The (n+1)-th stage gate driving snit GDU_n+1 is configured to receive a carry signal CR_n−3 output from a (n−3)-th stage gate driving unit, configured to receive a carry signal CR_n+5 from a (n+5)-th stage gate driving unit GDU_2+5, and configured to output a carry signal CR_n+1 to the (n+5)-th stage gate driving unit GDU_n+5. The (n+2)-th stage gate driving unit GDU_n+2 is configured to receive a carry signal CR_n−2 output from a (n−2)-th stage gate driving unit, configured to receive a carry signal CR_n−6 from a (n+6)-th stage gate driving unit, and configured to output a carry signal CR_n+2 to the (n+6) a stage gate driving unit. The (n+3)-th stage gate driving unit GDU_n+3 is configured to receive a carry signal CR_n−1 output from a (n−1)-th stage gate driving unit, configured to receive a carry signal CR_n+7 from a (n+7)-th stage gate driving unit, and configured to output a carry signal CR_n+3 to the (n+7)-th stage gate driving unit GDU_n+7. The (n+4)-th stage gate driving unit GDU_n−4 is configured to receive a carry signal CR_n output from the n-th stage gate driving unit GDU_n, configured to receive a carry signal CR_n+8 from a (n+8)-th stage gate driving unit, and configured to output a carry signal CR_n+4 to the (n+8)-th stage gate driving unit GDU_n+8. The (n+5)-th stage gate driving unit GDU_n+5 is configured to receive a carry signal CR_n+1 output from the (n+1)-th stage gate driving unit GDU_n+1, configured to receive a carry signal CR_n+9 from a (n+9)-th stage gate driving snit, and configured to output a carry signal CR_n+5 to the (n+9)-th stage gate driving unit GDU_n+9.

Figure 11:
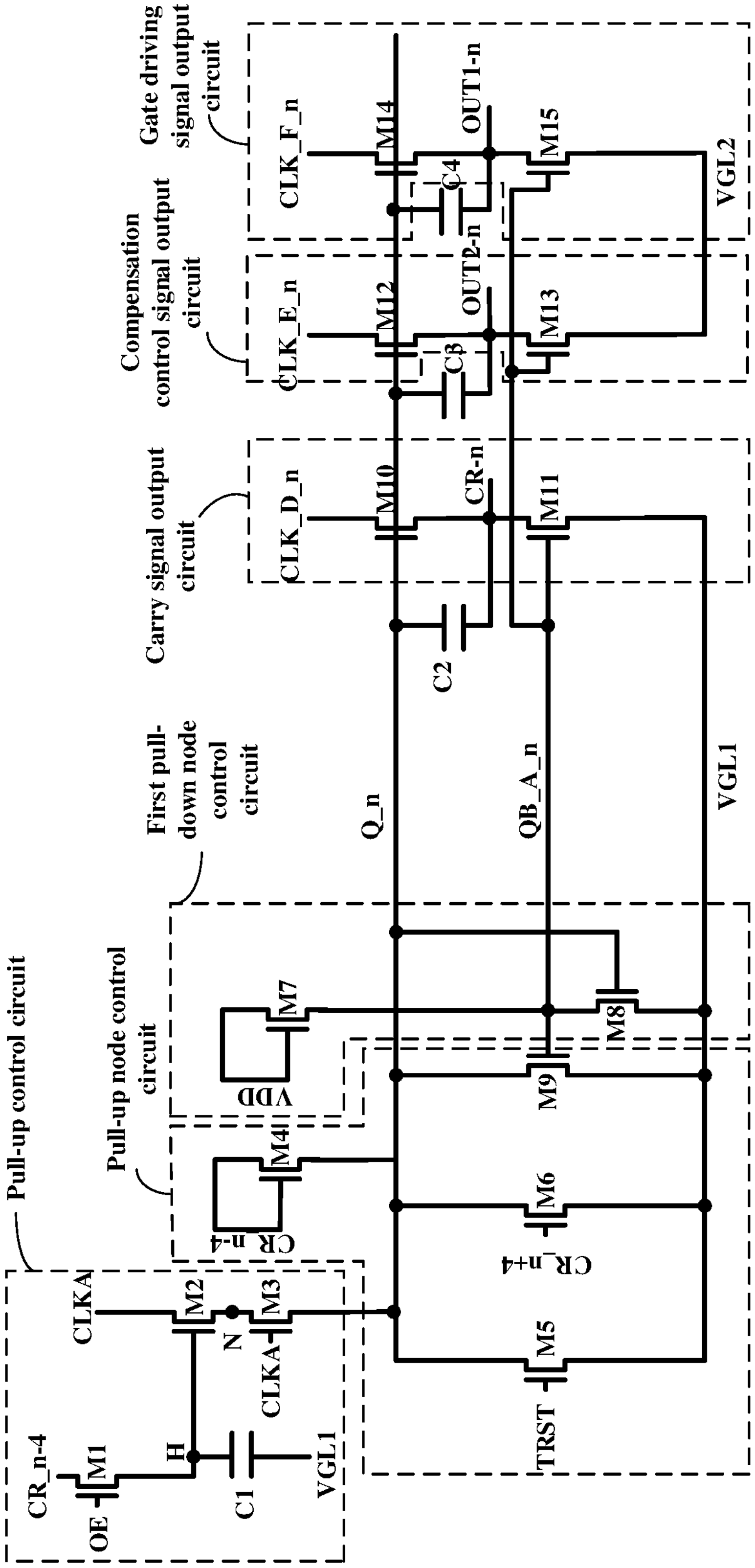
FIG. 11 is a schematic diagram illustrating a respective one of N number of stages of gate driving units in some embodiments according to the present disclose.

FIG. 11 is a schematic diagram illustrating a respective que of N number of stages of gate diving units in some embodiments according to the present disclosure. Referring to FIG. 11, the respective one of N number of stages of gate driving units is some embodiments includes a pull-up control circuit, a pull-up node control circuit, a first pull-down node control circuit, a carry signal output circuit, a compensation control signal output circuit, and a gate driving signal output circuit.

The pull-up control circuit in some embodiments includes a transistor M1 and a storage capacitor C1. A gate electrode of the transistor M1 is configured to receive an enabling signal input at the enabling terminal OE. A source electrode of the transistor M1 is configured to receive a carry signal CR_n−4 (output from a (n−4)-th stage gate driving unit). A draw electrode of the transistor M1 is coupled to a node H. A first terminal of the storage capacitor C1 is coupled to the node H. A second terminal of the storage capacitor C1 is configured to receive a first low voltage signal VGL1.

The pull-up control circuit in some embodiments further includes a transistor M2 and a transistor M3. A gate electrode of the transistor M2 is coupled to the node H. A source electrode of the transistor M2 is configured to receive a first clock signal CLKA. A drain electrode of the transistor M2 is coupled to the pull-up control node N. A gate electrode of the transistor M3 is configured to receive a first clock signal CLKA. A source electrode of the transistor M3 is coupled to the pull-up control node N. A dram electrode of the transistor M3 is coupled to the pull-up node control circuit.

The pull-up control circuit is configured to, under control of an enabling signal input by a enabling terminal OE and a carry signal CR_n−4, control a potential at a node H; under control of the potential at the node H, a first clock signal CLKA input by a first clock signal terminal, and a potential at a first pull-down node QB_A_n, control a potential at a pull-up control node N; under control of the potential at the pull-up control node N, control a potential at a pull-up node Q_n thereby controlling the potential at the pull-up node Q_n to be an effective voltage in a preset time period of a blank time period.

The pull-up node control circuit is some embodiments includes a transistor M4, a transistor M5, a transistor M6, a transistor M9, a storage capacitor C2, a storage capacitor C3, and a storage capacitor C4. A gate electrode and a source electrode of the transistor M4 are configured to receive a carry signal CR_n−4 (output from a (n−4)-th stage gate driving unit). A drain electrode of the transistor M4 is couple to the pull-up node Q_n. A gate electrode of the transistor M5 is coupled to a blank period reset terminal. TRST. A source electrode of the transistor M5 is coupled to the pull-up node Q_n. A drain electrode of the transistor M5 is configured to receive a low voltage signal VGL1. A gate electrode of the transistor M6 is configured to receive the carry signal CR_n−4 (output from a (n−4)-th stage gate driving unit). A source electrode of the transistor M6 is coupled to the pull-up node Q_n. A drain electrode of the transistor M6 is configured to receive the low voltage signal VGL1. A gate electrode of the transistor M9 is coupled to the fest pull-down node QB_A_n. A drain electrode of the transistor M9 is coupled to the pull-up node Q_n. A source electrode of the transistor M9 is configured to receive the low voltage signal VGL1. A first terminal of the storage capacitor C2 is coupled to the pull-up node Q_n. A second terminal of the storage capacitor C2 is coupled to the carry signal output terminal CR_n. A first terminal of the storage capacitor C3 is coupled to the pull-up node Q_n. A second terminal of the storage capacitor C3 is coupled to the compensation control signal output terminal OUT2−n. A first terminal of the storage capacitor C4 is coupled to the pull-up node Q_n. A second terminal of the storage capacitor C4 is coupled to the gate driving signal output terminal OUT1−n.

The pull-up node control circuit is configured to, under control of the carry signal CR_n−4, control the pull-up node Q_n to receive the carry signal CR_n−4; under control of the carry signal CR_n−4, control the pull-up node Q_n to receive the first low voltage signal VGL1; under control of a blank period reset signal input by the blank period reset terminal TRST, control the pull-up node Q_n to receive the first low voltage signal VGL1; under control of the potential at the first pull-down node QB_A_n, control the pull-up node Q_n to receive the first low voltage signal VGL1, and maintain the potential at the pull-up mode Q_n.

The first pull-down node control circuit is some embodiments includes a transistor M7 and a transistor M8. A gate electrode and a source electrode of the transistor M7 are configured to receive a high voltage signal VDD. A drain electrode of the transistor M7 is coupled to the first pull-down node QB_A_n. A gate electrode of the transistor M8 is coupled to the pull-up node Q_n. A drain electrode of the transistor M8 is coupled to the pull-downs node QB_A_n. A source electrode of the transistor M8 is configured to receive the first low voltage signal VGL1. The first pull-down node control circuit is configured to control a potential at the first pull-down node QB_A_n.

The carry signal output circuit in some embodiments includes a transistor M10 and a transistor M11. A gate electrode of the transistor M10 is coupled to the pull-up node Q_n. A source electrode of the transistor M10 is configured to receive a carry output clock signal CLK_D_n. A drain electrode of the transistor M10 is coupled to the carry signal output terminal CR-n. A gate electrode of the transistor M11 is coupled to the first pull-down mode QB_A_n. A drain electrode of the transistor M11 is coupled to the carry signal output terminal CR-n. A source electrode of the transistor M11 is configured to receive the fast low voltage signal VGL1.

The compensation control signal output circuit in some embodiments includes a transistor M12 and a transistor M13. A gate electrode of the transistor M12 is coupled to the pull-up mode Q_n. A source electrode of the transistor M12 is configured to receive a compensation clock signal CLK_E_n. A drain electrode of the transistor M12 is coupled to a compensation control signal output terminal OUT2−n. A gate electrode of the transistor M13 is coupled to the first pull-down node QB_A_n. A drain electrode of the transistor M13 is coupled to the compensation control signal output terminal OUT2−n. A source electrode of the transistor M13 is configured to receive the second low voltage signal VGL2.

The gate diving signal output circuit is some embodiments includes a transistor M14 and a transistor M15. A gate electrode of the transistor M14 is coupled to the pull-up node Q_n. A source electrode of the transistor M14 is configured to receive a gate driving clock signal CLK_F_n. A drain electrode of the transistor M14 is coupled to a gate driving signal output terminal OUT1−n. A gate electrode of the transistor M15 is coupled to the first pull-down node QB_A_n. A drain electrode of the transistor M15 is coupled to the gate driving signal output terminal OUT1−n. A source electrode of the transistor M15 is configured to receive the second low voltage signal VGL2.

Figure 12:
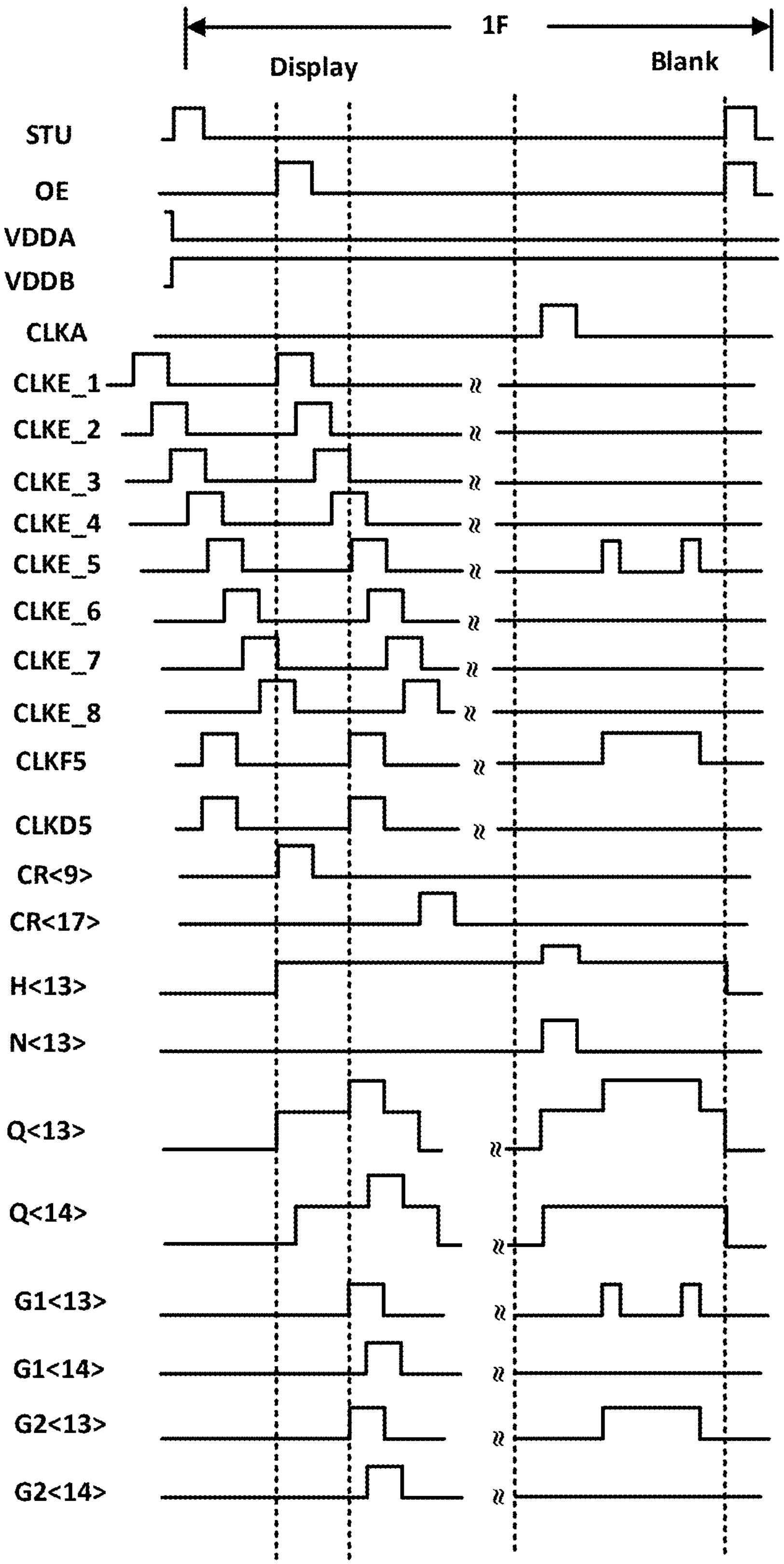
FIG. 12 is a timing diagram of operating a gate-on-array circuit in some embodiments according to the present disclosure.

FIG. 12 is a timing diagram of operating a gate-on-array circuit in some embodiments according to the present disclosure. Referring to FIG. 12, a frame of image IF includes a display period ("Display") and a blank time period ("Blank"). FIG. 12 illustrates an example of operating a thirteenth stage gate driving unit. STU stands for a start signal. OE stands for an enabling signal input at the enabling terminal OE. VDDA stands for a first high voltage signal. VDDB stands for a second high voltage signal. CLKA stands for a first clock signal.

FIG. 12 illustrates a thirteenth stage gate diving unit is a gate-on-array circuit having N number of stages of gate diving wits, in which the N number of stages of gate driving units include eight groups, a respective group of the eight groups includes eight gate driving units. Thus, the gate-on-array circuit includes eight compensation clock signal lines is total. CLKE_1, CLKE_2, CLKE_3, CLKE_4, CLKE_5 CLKE_6 CLKE_7, and CLKE_8, as shown in FIG. 12, stands for clock signals provided to the eight compensation clock signal lines, respectively.

Similarly, the gate on-array circuit includes eight carry output clock signal lines. CLKD5 shown in FIG. 12 stands for a carry output clock signal provided to the carry output clock signal line coupled to the thirteenth stage gate driving unit.

Similarly, the gate on-array circuit includes eight gate driving clock signal lines. CLKF5 shown in FIG. 12 stands for a gate driving clock signal provided to the gate driving clock signal line coupled to the thirteenth stage gate driving unit.

In FIG. 12, CR<9> stands for a carry signal CR_n−4 corresponding to the thirteenth stage gate driving unit. For example, the carry signal CR<9> is a carry signal output from a ninth stage gate driving unit. CR<17> stands for a carry signal CR_n+4 corresponding to the thirteenth stage gate driving suit. For example, the carry signal CR<∫> is a carry signal output from a seventeenth stage gate driving unit.

In FIG. 12, H<13> stands for a voltage signal at the node H in the thirteenth stage gate driving unit; N<13> stands for a voltage signal at the node N in the thirteenth stage gate driving unit.

In FIG. 12, Q<13> stands for a voltage signal at the pull-up node in the thirteenth stage gate diving unit (Q_n); Q<14> stands for a voltage signal at the pull-up node of the fourteenth stage gate driving unit (Q_n+1); G1<13> stands for a voltage signal at the compensation control signal output terminal in the thirteenth stage gate driving unit (OUT2−n); G1<14> stands for a voltage signal at the compensation control signal output terminal of the fourteenth stage gate driving unit (OUT2−n+1); G2<13> stands for a voltage signal at the gate driving signal output terminal in the thirteenth stage gate driving unit (OUT1−n); and G2<14> stands for a voltage signal at the gate driving signal output terminal of the fourteenth stage gate driving unit (OUT1−n+1).

Referring to FIG. 12, in the display period, CR<9> provides a high voltage signal to the thirteenth stage gate driving unit, turning on the transistor M4, a high voltage is written into the poll-up node of the thirteenth stage gate driving unit, as shown in the voltage level of Q<13> in FIG. 12.

Subsequently, referring to FIG. 11 and FIG. 12, high voltage signals are provided to CLKD5, CLKE5, and CLKF5, respectively. CLKD5 stands for a carry output clock signal provided to the carry signal output circuit of the thirteenth stage gate driving unit. CLKE5 stands for a compensation clock signal provided to the compensation control signal output circuit of the thirteenth stage gate driving unit. CLKF5 stands for a gate driving clock signal provided to the gate driving signal output circuit of the thirteenth stage gate driving unit. The high voltage level at the pull-up node of the thirteenth stage gate driving unit turns on transistor M10, M12, and M14, respectively. Accordingly, the high voltage signals from CLKD5, CLKE5, and CLKF5 are passed to the carry signal output terminal CR-n, the compensation control signal output terminal OUT2−n, and the gate driving signal output terminal OUT1−n.

Subsequently, low voltage signals are provided to CLKD5, CLKE5, and CLKF5, respectively. The carry signal output terminal CR-n, the compensation control signal output terminal OUT2−n, and the gate driving signal output terminal OUT2−n are reset to low voltage levels, respectively.

Subsequently, a high voltage signal CR<17> is provided to the gate electrode of the transistor M6, turning on the transistor M6. The voltage at the pull-up node is reset to a low voltage level (as depicted by the Q<13> waveform in FIG. 12).

In the display period, the enabling signal input at the enabling terminal OE has a same waveform as the CR<9>. A low voltage signal is written to the node H, and the low voltage level at the node H is maintained until the blank time period.

In the blank time period, the voltage signal at the node H is changed to a high voltage level, turning on the transistor M2. A high voltage signal CLKA is provided to the gate electrodes of the transistor M3, turning on the transistor M3. A high voltage signal is written to the pull-up node Q_n, as depicted by the Q<13> waveform in FIG. 12.

In the blank time period, high voltage signals CLKE5 and CLKF5 are provided to the source electrodes of M12 and M14, respectively. The high voltage level at the pull-up node Q_n turns on the transistor M12 and M14, respectively. The compensation control signal output terminal OUT2−n and the gate driving signal output terminal OUT1−n output signals required for compensation.

Figure 13:
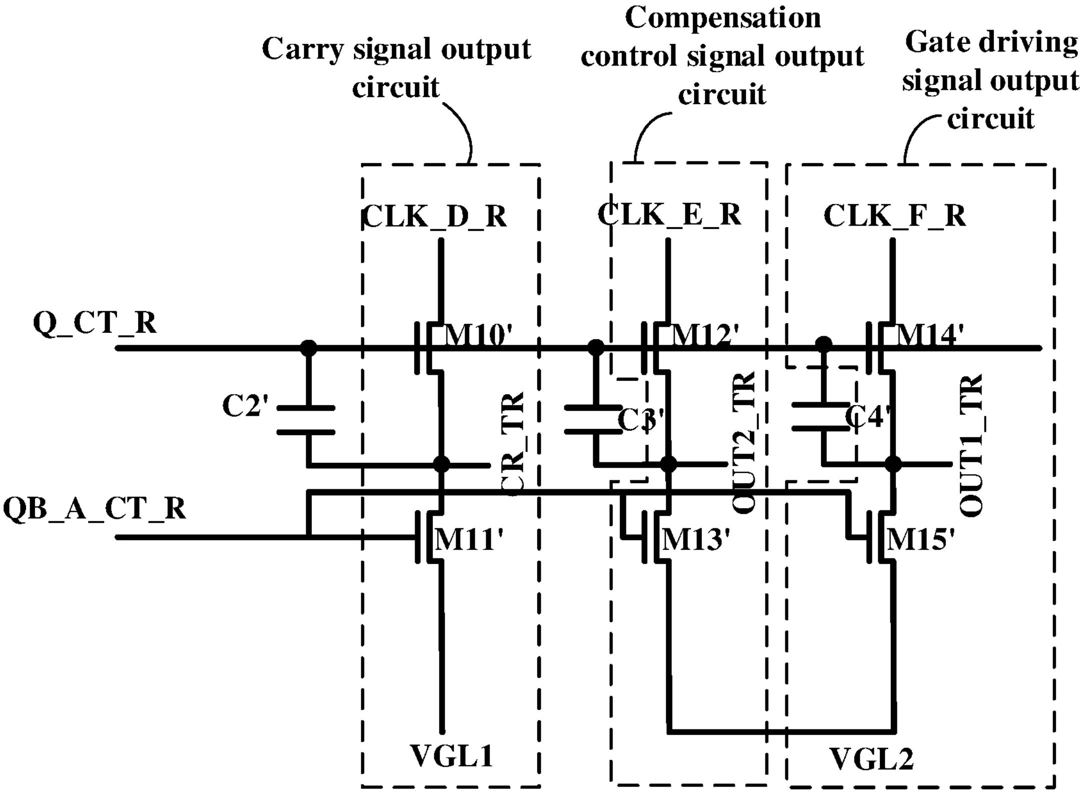
FIG. 13 is a schematic diagram illustrating a repair gate driving tut si some embodiments according to the present disclosure.

FIG. 13 is a schematic diagram illustrating a repair gate driving unit in some embodiments according to the present disclosure. Referring to FIG. 13, the repair gate driving unit in some embodiments includes a carry signal output circuit, a compensation control signal output circuit, a gate driving signal output circuit, a storage capacitor C2', a storage capacitor C3', and a storage capacitor C4'. The pull-up control circuit, the pull-up node control circuit, and the first pull-down node control circuit are absent in the repair gate driving unit.

The repair gate driving unit in some embodiments includes a pull-up node connecting terminal Q_CT_R, a fast pull-down node connecting terminal QB_A_CT_R, a repair carry signal output terminal CR_TR, a repair compensation control signal output terminal OUT2_TR, and a repair gate driving signal output terminal OUT1_TR. A first terminal of the storage capacitor C2' is coupled to the pull-up node connecting terminal Q_CT_R. A second terminal of the storage capacitor C2' is coupled to the repair carry signal output terminal CR_TR. A first terminal of the storage capacitor C3' is coupled to the pull-up node connecting terminal Q_CT_R. A second terminal of the storage capacitor C3' is coupled to the repair compensation control signal output terminal OUT2_TR. A first terminal of the storage capacitor C4' is coupled to the pull-up node connecting terminal Q_CT_R. A second terminal of the storage capacitor C4' is coupled to the repair gate driving signal output terminal OUT1_TR.

The carry signal output circuit in the repair gate driving unit includes a transistor M10' and a transistor M11'. A gate electrode of the transistor M10' is coupled to the pull-up node connecting terminal Q_CT_R. A source electrode of the transistor M10' is configured to receive a carry output clock signal from a repair carry output clock signal line CLK_D_R. A drain electrode of the transistor M10' is coupled to the repair carry signal output terminal CR_TR. A gate electrode of the transistor M11' is coupled to the first pull-down node connecting terminal QB_A_CT_R. A drain electrode of the transistor M11' is coupled to the repair carry signal output terminal CR_TR. A source electrode of the transistor M11' is configured to receive the first low voltage signal VGL1.

The compensation control signal output circuit in the repair gate driving unit includes a transistor M12' and a transistor M13'. A gate electrode of the transistor M12' is coupled to the pull-up node connecting terminal Q_CT_R. A source electrode of the transistor M12' is configured to receive a compensation clock signal from a repair compensation clock signal line CLK_E_R. A drain electrode of the transistor M12' is coupled to the repair compensation control signal output terminal OUT2_TR. A gate electrode of the transistor M13' is coupled to the first pull-down node connecting terminal QB_A_CT_R. A drain electrode of the transistor M13' is coupled to the repair compensation control signal output terminal OUT2_TR. A source electrode of the transistor M13' is configured to receive the second low voltage signal VGL2.

The gate diving signal output circuit in the repair gate driving unit includes a transistor M14' and a transistor M15'. A gate electrode of the transistor M14' is coupled to the pull-up node connecting terminal Q_CT_R. A source electrode of the transistor M14' is configured to receive a gate driving clock signal from a repair gate driving clock signal line CLK_F_R. A dram electrode of the transistor M14' is coupled to the repair gate driving signal output terminal OUT1_TR A gate electrode of the transistor M15' is coupled to the first pull-down node connecting terminal QB_A_CT_R. A drain electrode of the transistor M15' is coupled to the repair gate driving signal output terminal OUT1_IR. A source electrode of the transistor M15' is configured to receive the second low voltage signal VGL2.

Figure 14:
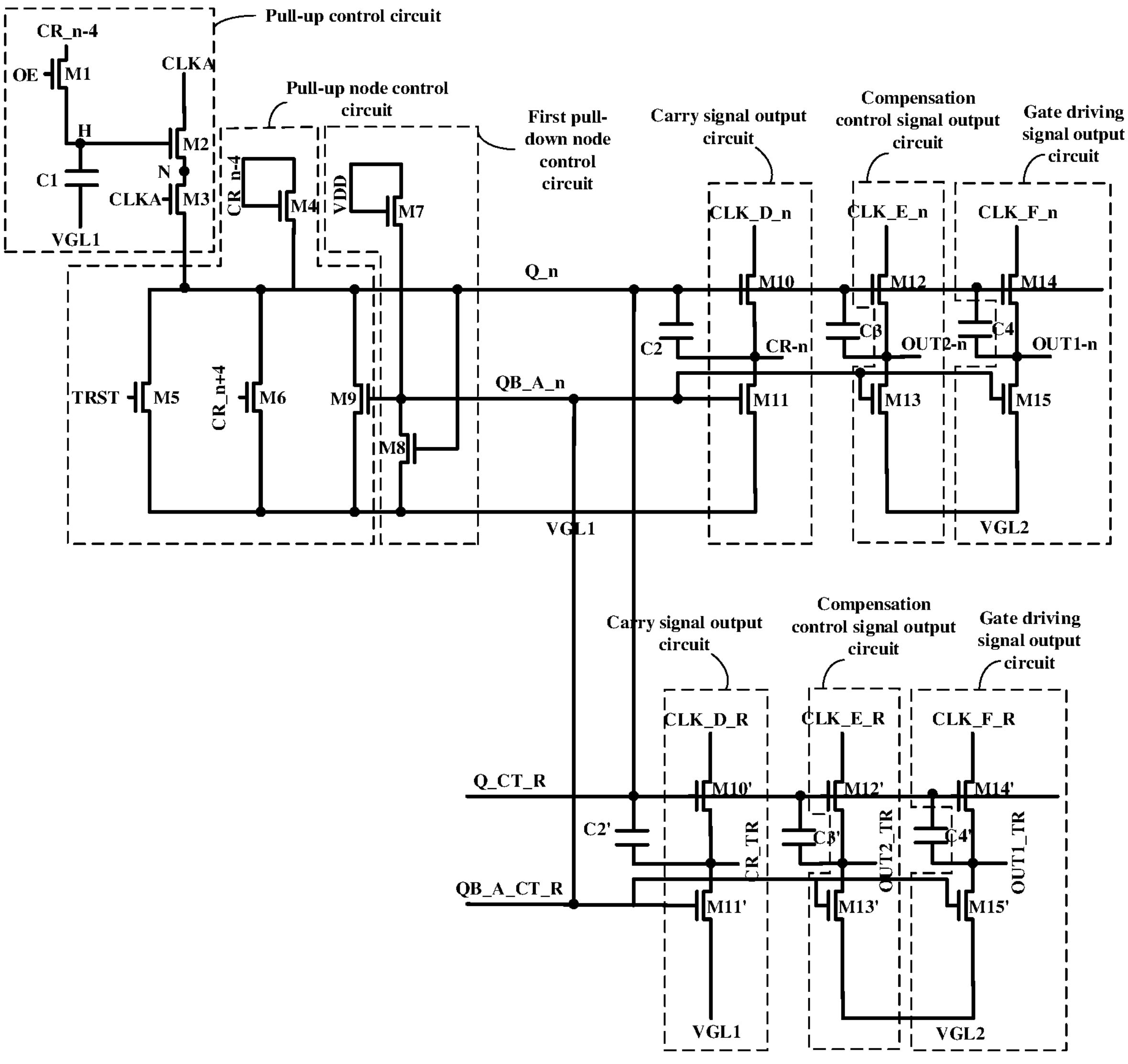
FIG. 14 is a schematic diagram illustrating a repaired gate-on-array circuit in some embodiments according to the present disclosure.

FIG. 14 is a schematic diagram illustrating a repaired gate-on-array circuit in some embodiments according to the present disclosure. Referring to FIG. 14, in the repaired gate-on-array circuit, a pull-up node connecting terminal Q_CT_R of a repair gate driving unit is connected to a pull-up node Q_n of a n-th gate driving unit of the N number of gate driving units; and a first pull-down mode connecting terminal QB_A_CT_R of the repair gate diving unit is connected to a first pull-down mode QB_A_n of the n-th gate diving unit of the N number of gate driving units, thereby repairing a dysfunctional gate driving unit is the gate-on-array circuit.

Figure 15:
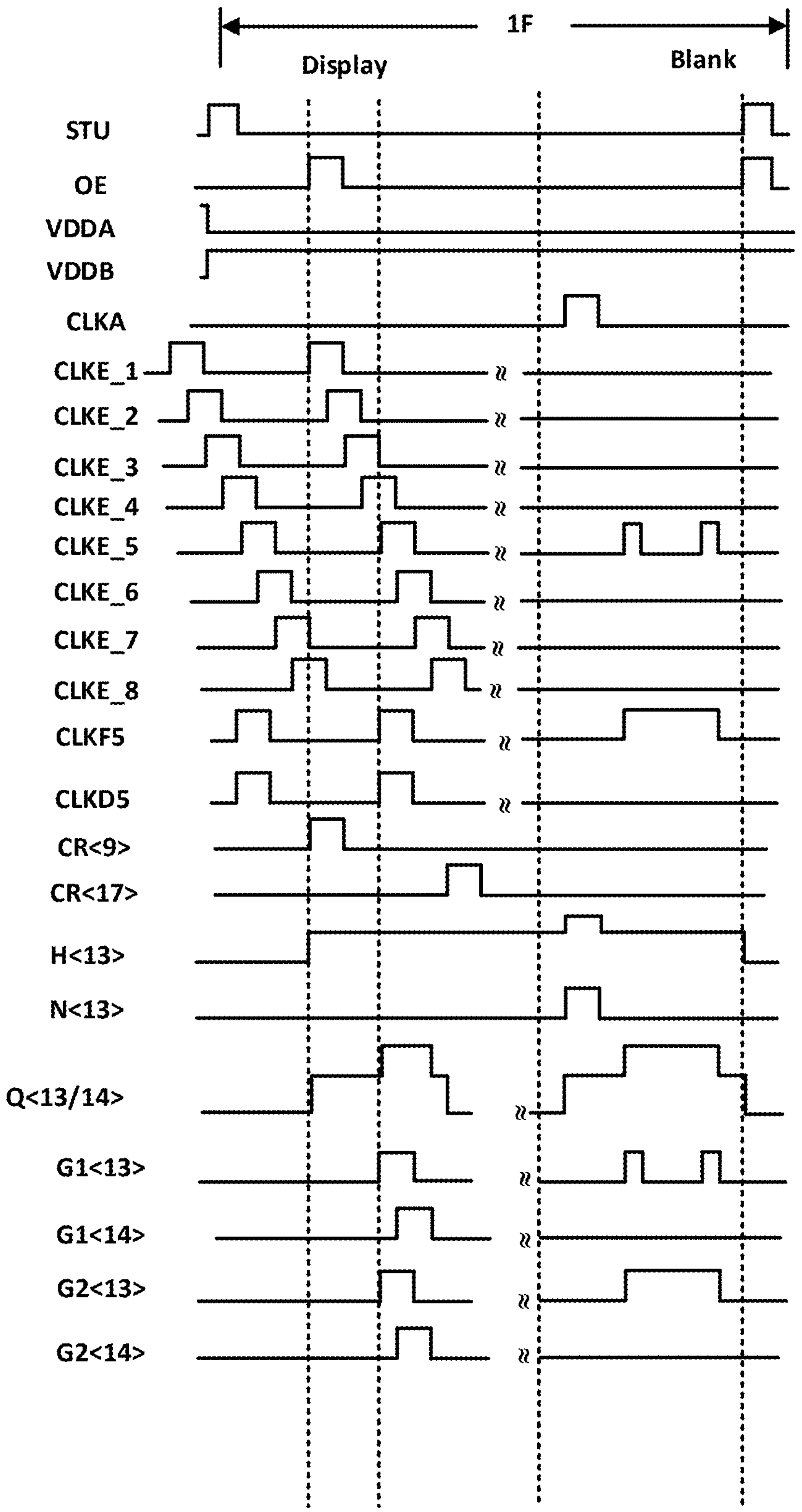
FIG. 15 is a timing diagram of operating a repaired gate-on-array circuit is some embodiments according to the present disclosure.

FIG. 15 is a timing diagram of operating a repaired gate-on-array circuit is some embodiments according to the present disclosure. Referring to FIG. 15, in the display period, CR<9> provides a high voltage signal to the thirteenth stage gate driving unit, turning on the transistor M4, a high voltage is written into the pull-up node of the fourteenth stage gate driving unit, as shows in the voltage level of Q13> is FIG. 12.

Subsequently, referring to FIG. 11 and FIG. 12, high voltage signals are provided to CLKD5, CLKE5, and CLKF5, respectively. CLKD5 stands for a carry output clock signal provided to the carry signal output circuit of the thirteenth stage gate diving unit. CLKE5 stands for a compensation clock signal provided to the compensation control signal output circuit of the thirteenth stage gate driving unit. CLKE5 stands for a gate driving clock signal provided to the gate driving signal output circuit of the thirteenth stage gate driving unit. The high voltage level at the pull-up mode of the thirteenth stage gate driving unit turns on transistor M10, M12, and M14, respectively. Accordingly, the high voltage signals from CLKD5, CLKE5, and CLKF5 are passed to the carry signal output terminal CR-n, the compensation control signal output terminal OUT2−n, and the gate driving signal output terminal OUT1−n.

Subsequently, referring to FIG. 11 and FIG. 12, high voltage signals are provided to CLK_D_R, CLK_E_R, ad CLK_F_R, respectively. The CLK_D_R, CLK_E_R, and CLK_F_R may be, in one example, CLKD6, CLKE6, and CLKF6, respectively. The high voltage provided to the pull-up node connecting terminal Q_CT_R of the repair gate driving unit turns on transistor M10', M12', and M14', respectively. Accordingly, the high voltage signals from CLK_D_R, CLK_E_R, and CLK_F_R are passed to the repair carry signal output terminal CR_TR, the repair compensation control signal output terminal OUT2_TR, and the repair gate driving signal output terminal OUT1_TR.

Subsequently, low voltage signals are provided to CLKD5, CLKE5, and CLKF5, respectively. The carry signal output terminal CR-n, the compensation control signal output terminal QUT2−n, and the gate driving signal output terminal OUT2−n are reset to low voltage levels, respectively.

Subsequently, low voltage signals are provided to CLK_D_R, CLK_E_R, and CL_KF_R, respectively. The repair carry signal output terminal CR_TR, the repair compensation control signal output terminal OUT2_TR, and the repair gate diving signal output terminal OUT1_TR are reset to low voltage levels, respectively.

Subsequently, a high voltage signal CR<17> is provided to the gate electrode of the transistor M6, turning on the transistor M6. The voltage at the pull-up node is reset to a low voltage level (as depicted by the Q<13> waveform in FIG. 12).

In the display period, the enabling signal input at the enabling terminal OE has a same waveform as the CR<9>. A low voltage signal is written to the node H, and the low voltage level at the node H is maintained until the blank time period.

In the blank time period, the voltage signal at the node H is changed to a high voltage level, turning on the transistor M2. A high voltage signal CLKA is provided to the gate electrodes of the transistor M3, turning on the transistor M3. A high voltage signal is written to the pull-up mode Q_n, as depicted by the Q<13> waveform in FIG. 12.

In the blank time period, high voltage signals CLKE5 and CLKE5 are provided to the source electrodes of M12 and M14, respectively. The high voltage level at the pull-up node Q_n turns on the transistor M12 and M14, respectively. The compensation control signal output terminal OUT2−n and the gate diving signal output terminal OUT1−n output signals required for compensation.

Similarly, in the blank time period, high voltage signals CLKE_R, and CLKF_R are provided to the source electrodes of M12' and M14', respectively. The high voltage level at the pull-up node connecting terminal Q_CT_R turns on the transistor M12' and M14", respectively. The repair compensation control signal output terminal OUT2_TR and the repair gate driving signal output terminal OUT1_TR output signals required for compensation.

Figure 16:
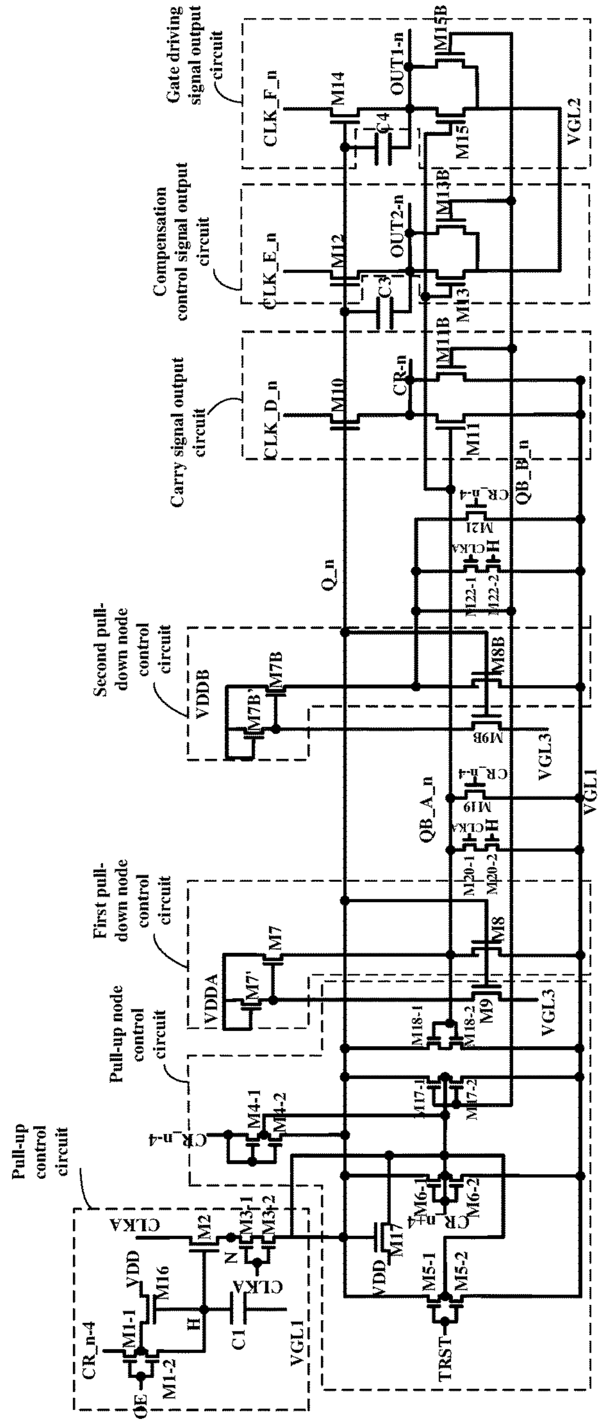
FIG. 16 is a schematic diagram illustrating a respective one of N number of stages of gate driving units in some embodiments according to the present disclosure.

FIG. 16 is a schematic diagram illustrating a respective one of N number of stages of gate driving units in some embodiments according to the present disclosure. Referring to FIG. 16, the respective one of N number of stages of gate driving units in some embodiments includes a pull-up control circuit, a pull-up node control circuit, a first pull-down node control circuit, a second pull-down node control circuit, a carry signal output circuit, a compensation control signal output circuit, and a gate driving signal output circuit.

The pull-up control circuit in some embodiments includes a transistor M1-1, a transistor M1-2, and a storage capacitor C1. Gate electrodes of the transistor M1-1 and the transistor M1-2 are configured to receive an enabling signal input at the enabling terminal OE. A source electrode of the transistor M1-1 is configured to receive a carry signal CR_n−4 (output from a (n−4)-th stage gate driving unit). A drain electrode of the transistor M1-1 is coupled to a source electrode of the transistor M1-2. A drain electrode of the transistor M1-2 is coupled to a node H. A first terminal of the storage capacitor C1 is coupled to the node H. A second terminal of the storage capacitor C1 is configured to receive a first low voltage signal VGL1. The pull-up control circuit further includes a transistor M16, a gate electrode of which is coupled to the node H, a source electrode of which is configured so receive a high voltage signal VDD, a drain electrode of which is coupled to the draw electrode of the transistor M1-1 and the source electrode of the transistor M1-2. The pull-up control circuit in some embodiments farther includes a transistor M2, a transistor M3-1, and a transistor M3-2. A gate electrode of the transistor M2 is coupled to the node H. A source electrode of the transistor M2 is configured to receive a first clock signal CLKA. A drain electrode of the transistor M2 is coupled to the pull-up control node N. Gate electrode of the transistor M3-1 and the transistor M3-2 are configured to receive the first clock signal CLKA. A source electrode of the transistor M3-1 is coupled to the pull-up control node N. A drain electrode of the transistor M3-1 is coupled to a source electrode of the transistor M3-2. A drain electrode of the transistor M3-2 is coupled to the pull-up node control circuit.

The pull-up node control circuit is some embodiments includes a transistor M4-1, a transistor M4-2, a transistor M5-1, a transistor M5-2, a transistor M6-1, a transistor M6-2, a transistor M9, a transistor M9B, a storage capacitor C3, and a storage capacitor C4. Gate electrodes of the transistor M4-1 and the transistor M4-2, and a source electrode of the transistor M4-1 are configured to receive a carry signal CR_n−4 (output from a (n−4)-th stage gate driving unit). A drain electrode of the transistor M4-1 is coupled to a source electrode of the transistor M4-2. A drain electrode of the transistor M4-2 is couple so the pull-up node Q_n. Gate electrodes of the transistor M5-1 and the transistor M5-2 are coupled to a blank period reset terminal TRST. A source electrode of the transistor M5-1 is coupled to the pull-up node Q_n. A drain electrode of the transistor M5-1 is coupled to a source electrode of the transistor M5-2. A drain electrode of the transistor M5-2 is configured to receive a low voltage signal VGL1. Gate electrodes of the transistor M6-1 and the transistor M6-2 are configured to receive the carry signal CR_n+4 (output from a (n+4)-th stage gate driving suit). A drain electrode of the transistor M6-1 is coupled to the pull-up node Q_n. A source electrode of the transistor M6-1 is coupled to a drain electrode of the transistor M6-2. A source electrode of the transistor M6-2 is configured to receive the low voltage signal VGL1. A gate electrode of the transistor M9 is coupled to the pull-up node Q_n. A drain electrode of the transistor M9 is coupled to the first pull-down mode control circuit (at M7'). A source electrode of the transistor M9 is configured to receive a low voltage signal VGL3. A gate electrode of the transistor M9B is coupled to the pull-up node Q_n. A drain electrode of the transistor M9B is coupled to the second pull-down node control circuit (at M7B'). A source electrode of the transistor M9B is configured to receive a low voltage signal VGL3. A first terminal of the storage capacitor C3 is coupled to the pull-up node Q_n. A second terminal of the storage capacitor C3 is coupled to the compensation control signal output terminal OUT2−n. A first terminal of the storage capacitor C4 is coupled to the pull-up node Q_n. A second terminal of the storage capacitor C4 is coupled to the gate driving signal output terminal OUT1−n. The pull-up node control circuit in some embodiments further includes a transistor M17-1, a transistor M17-2, a transistor M18-1, and a transistor M18-2. Gate electrodes of the transistor M17-1 and the transistor M17-2 are connected to the second pull-down node QB_B_n. Gate electrodes of the transistor M18-1 and the transistor M18-2 are connected to the first pull-down node QB_A_n. A drain electrode of the transistor M17-1 is coupled to the pull-up node Q_n. A source electrode of the transistor M17-1 as coupled to a drain electrode of the transistor M17-2. A source electrode of the transistor M17-2 is configured to receive the low voltage signal VGL1. A drain electrode of the transistor M18-1 is coupled to the pull-up node Q_n. A source electrode of the transistor M18-1 is coupled to a drain electrode of the transistor M18-2. A source electrode of the transistor M18-2 is configured to receive the low voltage signal VGL1.

The first pull-down node control circuit is some embodiments includes a transistor M7, a transistor M7', and a transistor M8. A gate electrode and a source electrode of the transistor M7' are configured to receive a first high voltage signal VDDA. A drain electrode of the transistor M7' is coupled to the drain electrode of the transistor M9 in the pull-up node control output. A gate electrode of the transistor M7 is coupled to the drain electrode of the transistor M7'. A source electrode of the transistor M7 is configured to receive the first high voltage signal VDDA. A drain electrode of the transistor M7 is coupled to the first pull-downs node QB_A_n. A gate electrode of the transistor M8 is coupled to the pull-up node Q_n. A drain electrode of the transistor M8 is coupled to the first pull-down node QB_A_n. A source electrode of the transistor M8 is configured to receive the first low voltage signal VGL1.

The second pull-down node control circuit in some embodiments includes a transistor M7B, a transistor MTB', and a transistor M8B. A gate electrode and a source electrode of the transistor M7B' are configured to receive a second high voltage signal VDDB. A drain electrode of the transistor M7B' is coupled to the drain electrode of the transistor M9B in the pull-up node control circuit. A gate electrode of the transistor M7B is coupled to the drain electrode of the transistor M7B'. A source electrode of the transistor M7B is configured to receive the second high voltage signal VDDB. A drain electrode of the transistor M7B' is coupled to a second pull-down node QB_B_n. A gate electrode of the transistor M8B is coupled to the pull-up node Q_n. A drain electrode of the transistor M8B is coupled to the second pull-down node QB_B_n. A source electrode of the transistor M8B is configured to receive the first low voltage signal VGL1.

The carry signal output circuit in some embodiments includes a transistor M10, a transistor M11, and a transistor M11B. A gate electrode of the transistor M10 is coupled to she pull-up mode Q_n. A source electrode of the transistor M10 is configured to receive a carry output clock signal CLK_D_n. A drain electrode of the transistor M10 is coupled to the carry signal output terminal CR-n. A gate electrode of the transistor M11 is coupled to the first pull-down node QB_A_n. A drain electrode of the transistor M11 is coupled to the carry signal output terminal CR-n. A source electrode of the transistor M11 is configured to receive the first low voltage signal VGL1. A gate electrode of the transistor M11B is coupled to the second pull-down mode QB_B_n. A drain electrode of the transistor M11B is coupled to the carry signal output terminal CR-n. A source electrode of the transistor M11B is configured to receive the first low voltage signal VGL1.

The compensation control signal output circuit in some embodiments includes a transistor M12, a transistor M13, and a transistor M13B. A gate electrode of the transistor M12 is coupled to the pull-up node Q_n. A source electrode of the transistor M12 is configured to receive a compensation clock signal CLK_E_n. A drain electrode of the transistor M12 is coupled to a compensation control signal output terminal OUT2−n. A gate electrode of the transistor M13 is coupled to the first pull-down node QB_A_n. A drain electrode of the transistor M13 is coupled to the compensation control signal output terminal OUT2−n. A source electrode of the transistor M13 is configured to receive the second low voltage signal VGL2. A gate electrode of the transistor M13B is coupled to the second pull-down node QB_B_n. A drain electrode of the transistor M13B is coupled to the compensation control signal output terminal OUT2−n . A source electrode of the transistor M13B is configured to receive the second low voltage signal VGL2.

The gate driving signal output circuit in some embodiments includes a transistor M14, a transistor M15, and a transistor M15B. A gate electrode of the transistor M14 is coupled to the pull-up node Q_n. A source electrode of the transistor M14 is configured to receive a gate driving clock signal CLK_F_n. A drain electrode of the transistor M14 is coupled to a gate driving signal output terminal OUT1−n. A gate electrode of the transistor M15 is coupled to the first pull-down node QB_A_n. A drain electrode of the transistor M15 is coupled to the gate driving signal output terminal OUT1−n. A source electrode of the transistor M15 is configured to receive the second low voltage signal VGL2. A gate electrode of the transistor M15B is coupled to the second pull-down mode QB_B_n. A drain electrode of the transistor M15B is coupled to the gate driving signal output terminal OUT1−n. A source electrode of the transistor M15B is configured to receive the second low voltage signal VGL2.

The respective one of N number of stages of gate driving units in some embodiments. Further includes a transistor M19. A gate electrode of the transistor M19 is configured to receive the carry signal CR_n−4 output from a (n−4)-th stage gate driving unit. A drain electrode of the transistor M19 is coupled to the first pull-down node QB_A_n. A source electrode of the transistor M19 is configured to receive the low voltage signal VGL1.

The respective one of N number of stages of gate driving units in some embodiments further includes a transistor M20-1 and a transistor M20-2. A gate electrode of the transistor M20-1 is configured to receive the first clock signal CLKA. A gate electrode of the transistor M20-2 is coupled to the node H. A drain electrode of the transistor M20-1 is coupled to the first pull-down node QB_A_n. A source electrode of the transistor M120-1 is coupled to a drain electrode of the transistor M20-2. A source electrode of the transistor M20-2 is configured to receive the low voltage signal VGL1.

The respective one of N number of stages of gate driving units in some embodiments further includes a transistor M21. A gate electrode of the transistor M21 is configured to receive the carry signal CR_n−4 output from a (n−4)-th stage gate driving unit. A drain electrode of the transistor M21 is coupled to the drain electrode of the transistor M7B. A source electrode of the transistor M21 is configured to receive the low voltage signal VGL1.

The respective one of N number of stages of gate driving units in some embodiments further includes a transistor M22-1 and a transistor M22-2. A gate electrode of the transistor M22-1 is configured to receive the first clock signal CLKA. A gate electrode of the transistor M22-2 is coupled to the node H. A drain electrode of the transistor M22-1 is coupled to the drain electrode of the transistor M7B. A source electrode of the transistor M22-1 is coupled to a drain electrode of the transistor M22-2. A source electrode of the transistor M22-2 is configured to receive the low voltage signal VGL1.

Figure 17:
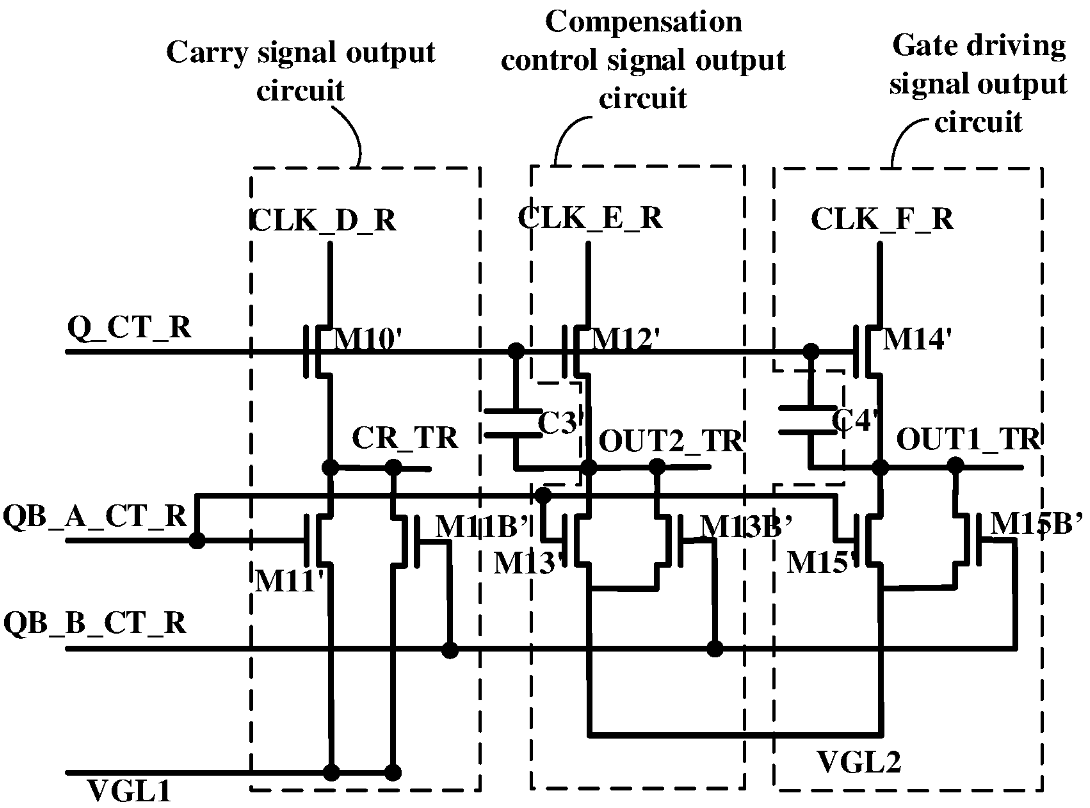
FIG. 17 is a schematic diagram illustrating a repair gate driving unit in some embodiments according to the present disclosure.

FIG. 17 is a schematic diagram illustrating a repair gate driving unit in some embodiments according to the present disclosure. Referring to FIG. 17, the repair gate driving unit in some embodiments includes a carry signal output circuit, a compensation control signal output circuit, a gate driving signal output circuit, a storage capacitor C3', and a storage capacitor C4'. The pull-up control circuit, the pull-up node control circuit, the first pull-down node control circuit, and the second pull-down node control circuit are absent is the repair gate driving unit.

The repair gate driving unit in some embodiments includes a pull-up node connecting terminal Q_CT_R, a first pull-down node connecting terminal QB_A_CT_R, a second pull-down node connecting terminal QB_B_CT_R, a repair carry signal output terminal CR_TR, a repair compensation control signal output terminal OUT2_TR, and a repair gate driving signal output terminal OUT1_TR. A first terminal of the storage capacitor C3' is coupled to the pull-up node connecting terminal Q_CT_R. A second terminal of the storage capacitor C3' is coupled to the repair compensation control signal output terminal OUT2_TR. A first terminal of the storage capacitor C4' is coupled to the pull-up node connecting terminal Q_CT_R. A second terminal of the storage capacitor C4' is coupled to the repair gate driving signal output terminal OUT1_TR.

The carry signal output circuit in the repair gate driving unit includes a transistor M10', a transistor M11', and a transistor M11B'. A gate electrode of the transistor M10' is coupled to the pull-up node connecting terminal Q_CT_R. A source electrode of the transistor M10' is configured to receive a carry output clock signal from a repair carry output clock signal line CLK_D_R. A drain electrode of the transistor M10' is coupled to the repair carry signal output terminal CR_TR. A gate electrode of the transistor M11' is coupled to the first pull-down node connecting terminal QB_A_CT_R. A drain electrode of the transistor M11' is coupled to the repair carry signal output terminal CR_TR. A source electrode of the transistor M11' is configured to receive the first low voltage signal VGL1. A gate electrode of the transistor M11B' is coupled to the second pull-down node connecting terminal QB_B_CT_R. A drain electrode of the transistor M11B' is coupled to the carry signal output terminal CR_TR. A source electrode of the transistor M11B' is configured to receive the first low voltage signal VGL1.

The compensation control signal output circuit in the repair gate driving unit includes a transistor M12', a transistor M13', and a transistor M13B'. A gate electrode of the transistor M12' is coupled to the pull-up node connecting terminal Q_CT_R. A source electrode of the transistor M12' is configured to receive a compensation clock signal from a repair compensation clock signal line CLK_E_R. A drain electrode of the transistor M12' is coupled to the repair compensation control signal output terminal OUT2_TR. A gate electrode of the transistor M13' is coupled to the first pull-down node connecting terminal QB_A_CT_R. A drain electrode of the transistor M13' is coupled to the repair compensation control signal output terminal OUT2_TR. A source electrode of the transistor M13' is configured to receive the second low voltage signal VGL2. A gate electrode of the transistor M13B' is coupled to the second pull-down node connecting terminal QB_B_CT_R. A drain electrode of the transistor M13B' is coupled to the compensation control signal output terminal OUT2_TR. A source electrode of the transistor M13B' is configured to receive the second low voltage signal VGL2.

The gate driving signal output circuit in the repair gate driving unit includes a transistor M14', a transistor M15', and a transistor M15B'. A gate electrode of the transistor M14' is coupled to the pull-up node connecting terminal Q_CT_R. A source electrode of the transistor M14' is configured to receive a gate driving clock signal from a repair gate driving clock signal line CLK_F_R. A drain electrode of the transistor M14' is coupled to the repair gate driving signal output terminal OUT1_TR. A gate electrode of the transistor M15' is coupled to the first pull-down node connecting terminal QB_A_CT_R. A drain electrode of the transistor M15' is coupled to the repair gate driving signal output terminal OUT1_TR. A source electrode of the transistor M15' is configured to receive the second low voltage signal VGL2. A gate electrode of the transistor M15B is coupled to the second pull-down node connecting terminal QB_B_CT_R. A drain electrode of the transistor M15B is coupled to the gate driving signal output terminal OUT1_TR. A source electrode of the transistor M15B is configured to receive the second low voltage signal VGL2.

Figure 18:
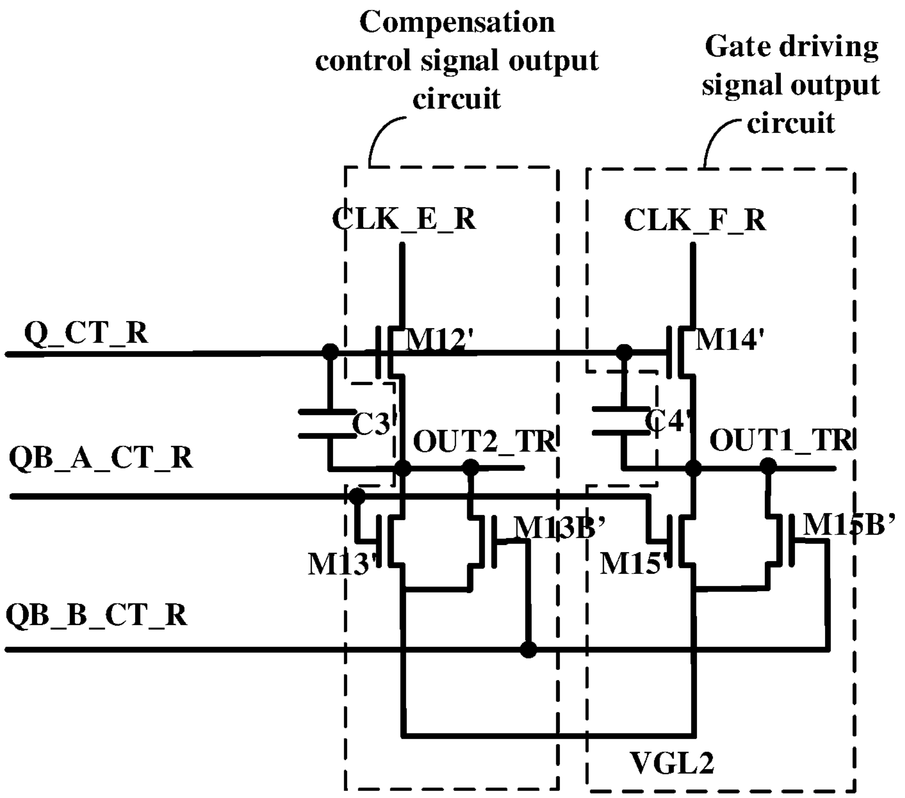
FIG. 18 is a schematic diagram illustrating a repair gate driving unit as some embodiments according to the present disclosure.

FIG. 18 is a schematic diagram illustrating a repair gate driving unit in some embodiments according to the present disclosure. As compared to the repair gate driving unit in FIG. 17, the repair gate driving unit in FIG. 18 does not include a carry signal output circuit.

Figure 19:
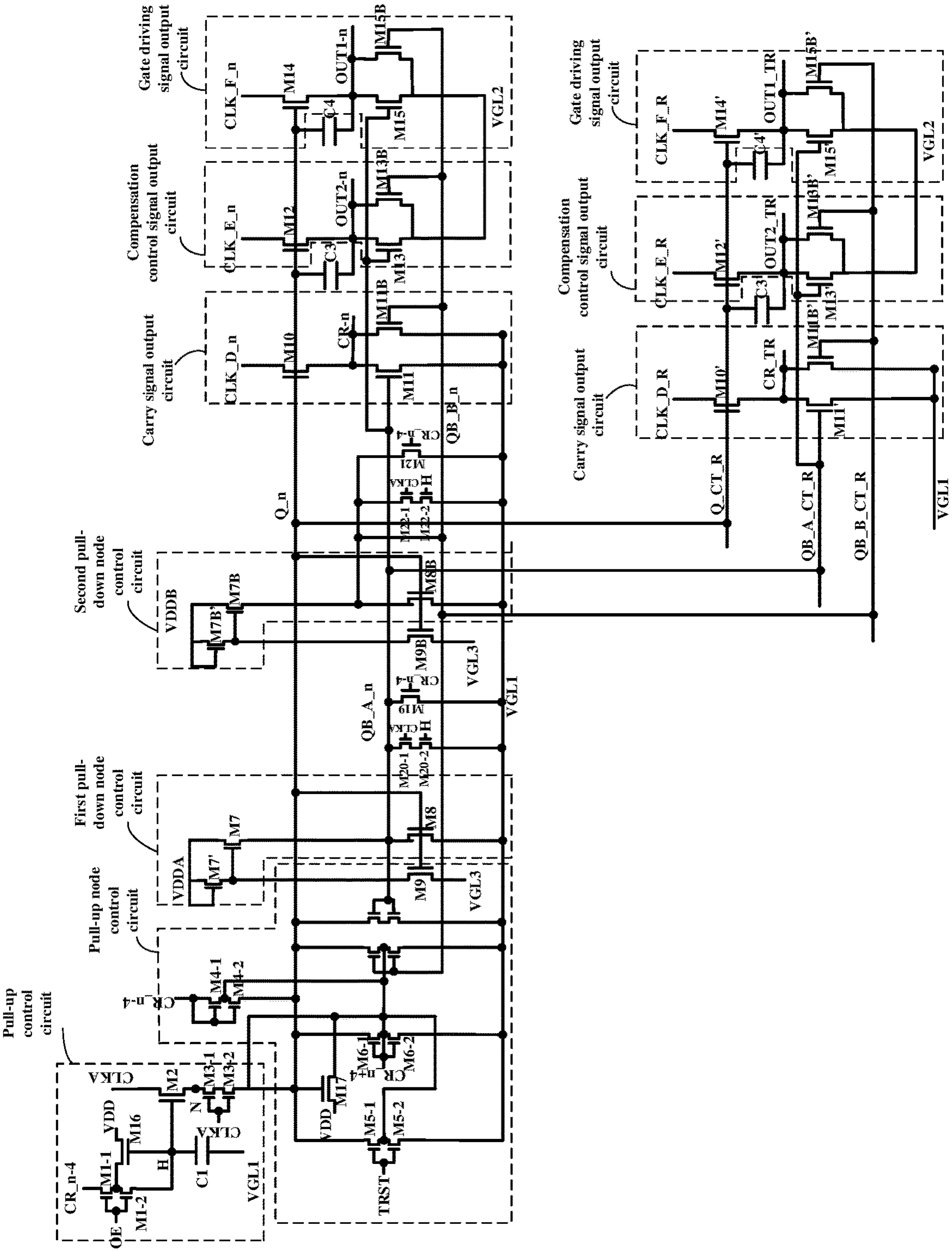
FIG. 19 is a schematic diagram illustrating a repaired gate-on-array circuit in some embodiments according to the present disclosure.
Figure 20:
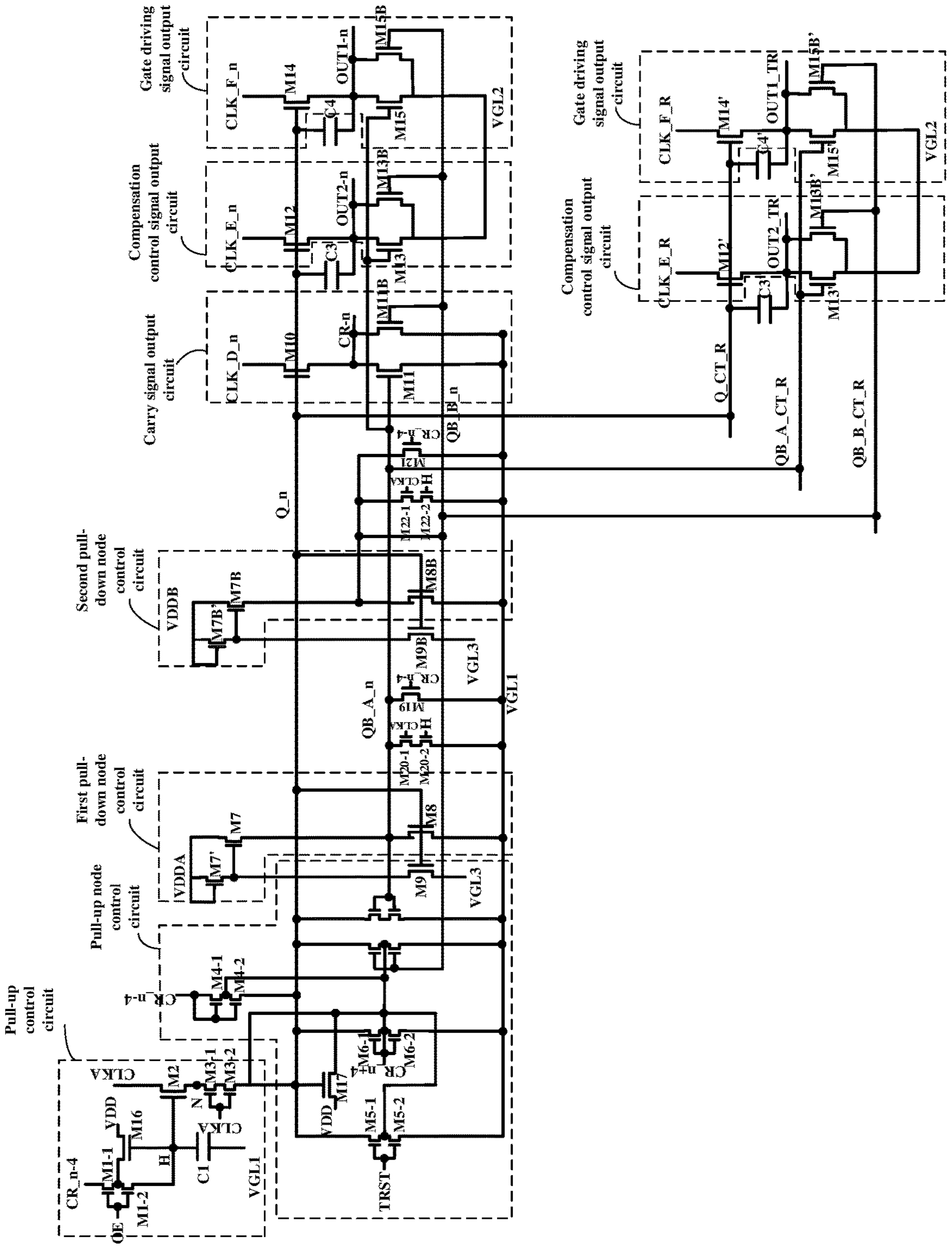
FIG. 20 is a schematic diagram illustrating a repaired gate-on-array circuit in some embodiments according to the present disclosure.

FIG. 19 is a schematic diagram illustrating a repaired gate-on-array circuit in some embodiments according to the present disclosure. FIG. 20 is a schematic diagram illustrating a repaired gate-on-array circuit in some embodiments according to the present disclosure. Referring to FIG. 19 and FIG. 20, in the repaired gate-on-array circuit, a pull-up node connecting terminal Q_CT_R of a repair gate driving unit is connected to a pull-up node Q_n of a n-th gate driving unit of the N number of gate driving units; a first pull-down node connecting terminal QB_A_CT_R of the repair gate driving unit is connected to a first pull-down node QB_A_n of the n-th gate driving unit of the N number of gate driving units; and a second pull-down node connecting terminal QB_B_CT_R of the repair gate driving unit is connected to a second pull-down node QB_B_n of the n-th gate driving unit of the N number of gate driving suits, thereby repairing a dysfunctional gate driving unit in the gate-on-array circuit.

In another aspect, the present disclosure provide a display apparatus. In some embodiments, the display apparatus includes a display panel and a gate on-array circuit described herein connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

Figure 21:
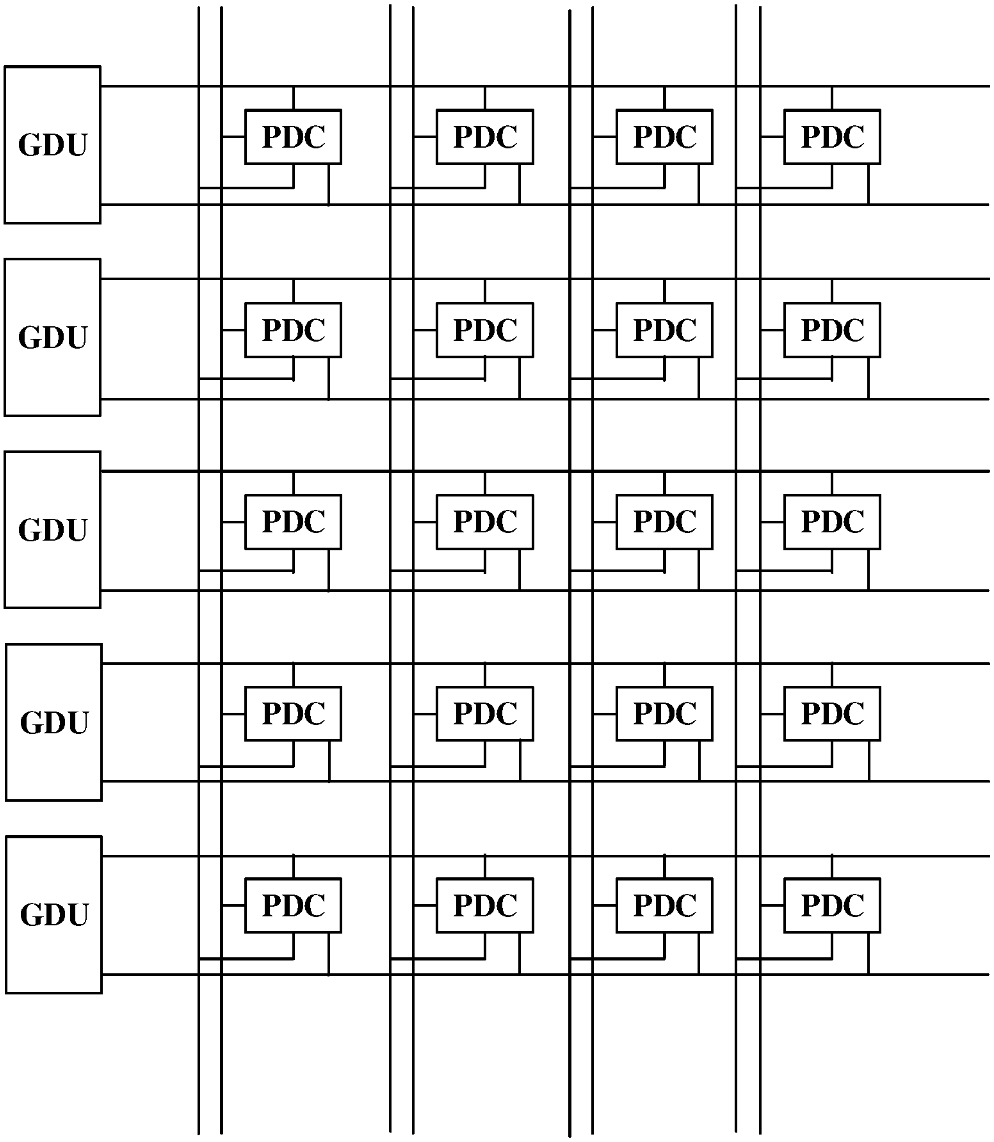
FIG. 21 is a schematic diagram illustrating a display apparatus in some embodiments according to the present disclosure.

FIG. 21 is a schematic diagram illustrating a display apparatus in some embodiments according to the present disclosure. Referring to FIG. 21, a respective stage of gate driving unit GDU is connected to a row of pixel driving circuits PDC. When one of the gate diving unit becomes dysfunctional, a repair gate driving circuit is configured to be connected to the row of pixel driving circuits PDC corresponding to the dysfunctional gate driving unit.

Figure 22:
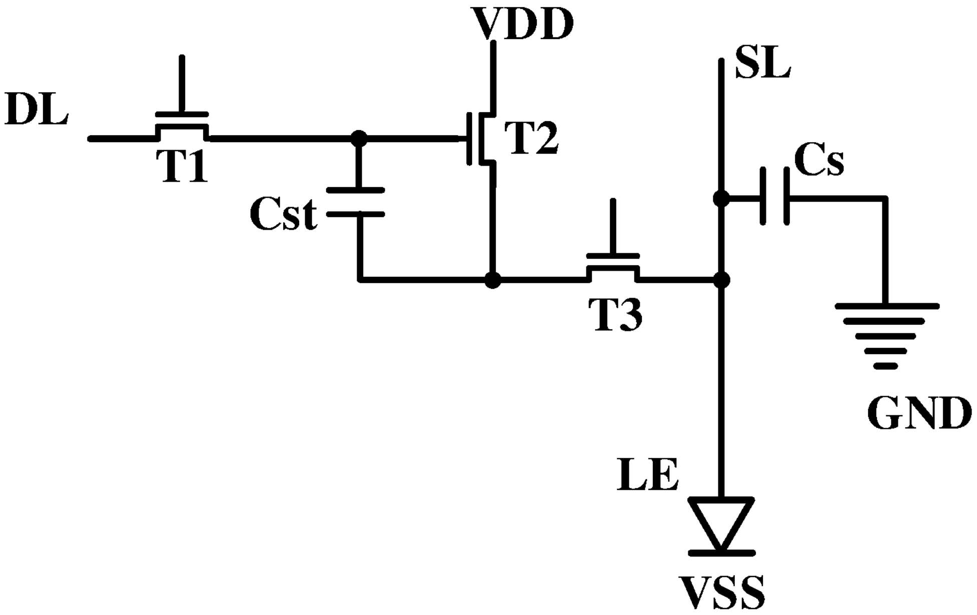
FIG. 22 is a schematic diagram illustrating a pixel driving circuit is some embodiments according to the present disclosure.

FIG. 22 is a schematic diagram illustrating a pixel driving circuit as some embodiments according to the present disclosure. Referring to FIG. 22, a pixel circuit with compensation function in some embodiments includes a data write transistor T1 connected to a data line DL, a storage capacitor Cst, a driving transistor T2 connected to a high voltage signal line VDD, a light emitting element LE connected to a low voltage signal line VSS, a compensation control transistor T3. A gate electrode of T1 is coupled with a corresponding stage gate driving signal output terminal. A gate electrode of T3 is coupled to a corresponding stage compensation control signal output terminal (see, e.g., OUT2-n in FIG. 16), or a corresponding repair compensation control signal output terminal (see, e.g., OUT2_TR in FIG. 19 and FIG. 20). A drain electrode of the compensation control transistor T3 is connected to a compensation line SL. Parasitic capacitance on the compensation line SL is denoted as $C_5$.

Referring to FIG. 12 and FIG. 15, in a corresponding row output phase of the display period, a gate driving circuit or a repair gate driving unit according to one embodiment of the present disclosure is configured to output au effective voltage from the corresponding stage gate driving signal output terminal or the repair gate driving signal output terminal. When the gate driving circuit or the repair gate driving unit is in operation, if one row pixel driving circuit needs to be compensated the enabling terminal of the corresponding pull-up control circuit is controlled to input an effective voltage, so that the compensation control signal output terminal of the corresponding stage gate driving unit, or the repair compensation control signal output terminal of the repair gate driving unit, outputs an effective voltage is the blank time period thereby realizing a random compensation.

In one example, the corresponding stage gate driving unit or the repair gate driving circuit may be randomly compensated when the display panel shows poor display, thereby avoiding the brightness deviation of the display panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiment and with various modifications as are suited to the particular use or implementation contemplated. It is intended that the scope of the invention be defined by the claims appended hereto and their equivalents in which all terms are meant as their broadest reasonable sense unless otherwise indicated. Therefore, the term “the invention”, “the present invention” or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of repairing a gate-on-array circuit comprising N number of stages of shift registers, the N number of stages of shift registers comprising a X-th stage shift register, 1≤X≤N, X and N being positive integers;

wherein the method comprises at least one of:

disconnecting a X-th stage gate driving signal output terminal from a X-th stage gate driving signal output line;

disconnecting a X-th stage compensation control signal output terminal from a X-th stage compensation control signal output line; or disconnecting a X-th stage carry signal output terminal from a X-th stage carry signal output line;

wherein the X-th stage gate driving signal output terminal, the X-th stage compensation control signal output terminal, and the X-th stage carry signal output terminal are terminals of a single shift register of the X-th stage; and the X-th stage gate driving signal output line, the X-th stage compensation control signal output line, and the X-th stage carry signal output line are output lines of the single shift register of the X-th stage;

the method further comprises at least one of:

connecting the X-th stage gate driving signal output line to a repair gate driving signal output terminal through a gate driving signal output repair line;

connecting the X-th stage compensation control signal output line to a repair compensation control signal output terminal through a compensation control signal output repair line; or connecting the X-th stage carry signal output line to a repair carry signal output terminal through a carry signal output repair line;

wherein the X-th stage gate driving signal output line, the X-th stage compensation control signal output line, and the X-th stage carry signal output line are different from each other;

the X-th stage compensation control signal output terminal and the X-th stage carry signal output terminal are different from each other;

the repair gate driving signal output terminal, the repair compensation control signal output terminal, and the repair carry signal output terminal are different from each other; and the compensation control signal output repair line and the carry signal output repair line are different from each other.

2. The method of claim 1, wherein the repair gate driving signal output terminal is a gate driving signal output terminal of a repair shift register;

the repair compensation control signal output terminal is a compensation control signal output terminal of the repair shift register; or the repair carry signal output terminal is a carry signal output terminal of the repair shift register.

3. The method of claim 1, further comprising at least one of:

connecting a pull-up node connecting terminal of a repair shift register to a n-th stage pull-up node of a n-th stage shift register through a pull-up node repair line, 1≤n≤N, and n≠X, n being a positive integer;

connecting a first pull-down node connecting terminal of the repair shift register to a n-th stage first pull-down node of the n-th stage shift register through a first pull-down node repair line; or connecting a second pull-down node connecting terminal of the repair shift register to a n-th stage second pull-down node of the n-th stage shift register through a second pull-down node repair line.

4. The method of claim 3, wherein n=X−1.

5. The method of claim 2, wherein the repair shift register and the X-th stage shift register are coupled to at least one of:

one or more carry output clock signal lines configured to provide a same carry output clock signal;

one or more compensation clock signal lines configured to provide a same compensation clock signal; or one or more gate driving clock signal lines configured to provide a same gate driving clock signal.

6. The method of claim 2, wherein the repair shift register and the X-th stage shift register are coupled to at least one of a same carry output clock signal line, a same compensation clock signal line, or a same gate driving clock signal line.

7. The method of claim 2, wherein the gate-on-array circuit comprises:

the N number of stages of shift registers;

K number of repair shift registers; and at least one of M number of carry output clock signal lines, M number of compensation clock signal lines, or M number of gate driving clock signal lines;

wherein the N number of stages of shift registers comprise K groups, a respective group of the K groups comprising M number of shift registers, N=(M*K), K and M being positive integers; and a m-th shift register in the respective group is coupled to at least one of a m-th carry output clock signal line, a m-th compensation clock signal line, or a m-th gate driving clock signal line.

8. The method of claim 2, wherein the repair shift register and the X-th stage shift register are coupled to at least one of:

two different carry output clock signal lines configured to provide a same carry output clock signal;

two different compensation clock signal lines configured to provide a same compensation clock signal; or two different gate driving clock signal lines configured to provide a same gate driving clock signal.

9. The method of claim 2, wherein the gate-on-array circuit comprises:

the N number of stages of shift registers;

the repair shift register;

at least one of M number of carry output clock signal lines, M number of compensation clock signal lines, or M number of gate driving clock signal lines; and at least one of a repair carry output clock signal line, a repair compensation clock signal line, or a repair gate driving clock signal line;

wherein the N number of stages of shift registers comprise K groups, a respective group of the K groups comprising M number of shift registers, N=(M*K), K and M being positive integers;

a m-th shift register in the respective group is coupled to at least one of a m-th carry output clock signal line, a m-th compensation clock signal line, or a m-th gate driving clock signal line; and the repair shift register is coupled to at least one of the repair carry output clock signal line, the repair compensation clock signal line, or the repair gate driving clock signal line.

10. The method of claim 9, further comprising at least one of:

providing a same carry output clock signal to the repair carry output clock signal line and a carry output clock signal line coupled to the X-th stage shift register;

providing a same compensation clock signal to the repair compensation clock signal line and a compensation clock signal line coupled to the X-th stage shift register; or providing a same gate driving clock signal to the repair gate driving clock signal line and a gate driving clock signal line coupled to the X-th stage shift register.

11. The method of claim 1, wherein the repair gate driving signal output terminal is a n-th stage gate driving signal output terminal of a n-th stage shift register, $1 \leq n \leq N$, and $n \neq X$;

the repair compensation control signal output terminal is a n-th stage compensation control signal output terminal of the n-th stage shift register; or the repair carry signal output terminal is a n-th stage repair carry signal output terminal of the n-th stage shift register.

12. The method of claim 11, wherein $n=X-1$.

* * * * *